United States Patent
Lie et al.

(10) Patent No.: US 10,627,528 B2
(45) Date of Patent: Apr. 21, 2020

(54) SATELLITE NAVIGATION RECEIVER AND METHOD FOR SWITCHING BETWEEN REAL-TIME KINEMATIC MODE AND PRECISE POSITIONING MODE

(71) Applicant: Deere & Company, Moline, IL (US)

(72) Inventors: F. Adhika Pradipta Lie, Torrance, CA (US); Michael A. Zeitzew, Redondo Beach, CA (US); Yunfeng Shao, Torrance, CA (US); Liwen L. Dai, Torrance, CA (US)

(73) Assignee: Deere & Company, Moline, IL (US)

( * ) Notice: Subject to any disclaimer, the term of this patent is extended or adjusted under 35 U.S.C. 154(b) by 384 days.

(21) Appl. No.: 15/074,183

(22) Filed: Mar. 18, 2016

(65) Prior Publication Data

US 2017/0299731 A1    Oct. 19, 2017

Related U.S. Application Data

(60) Provisional application No. 62/186,009, filed on Jun. 29, 2015, provisional application No. 62/219,880, filed on Sep. 17, 2015.

(51) Int. Cl.
*G01S 19/48* (2010.01)
*G01S 19/44* (2010.01)
(Continued)

(52) U.S. Cl.
CPC ............ *G01S 19/48* (2013.01); *G01S 19/426* (2013.01); *G01S 19/43* (2013.01); *G01S 19/44* (2013.01);
(Continued)

(58) Field of Classification Search
CPC .......... G01S 19/48; G01S 19/13; G01S 19/44; G01S 19/14; G01S 19/07; G01S 19/45; G01S 5/0263
(Continued)

(56) References Cited

U.S. PATENT DOCUMENTS 5,610,614 A    3/1997    Talbot et al.
5,757,646 A    5/1998    Talbot et al.
(Continued)

FOREIGN PATENT DOCUMENTS

CN    102124371 A    7/2011
EP    2759849 A1    7/2014
(Continued)

OTHER PUBLICATIONS

The International Search Report and the Written Opinion of the International Searching Authority issued in counterpart application No. PCT/US16/038610, dated Sep. 14, 2016 (10 pages).

(Continued)

*Primary Examiner* — Chuong P Nguyen

(57) ABSTRACT

A system or method uses an offset vector to provide seamless switching between a real- time kinematic (RTK) mode and a precise positioning mode. A correction wireless device is adapted to receive, at the reference receiver, a precise signal encoded with precise correction data. A precise positioning estimator of the reference receiver is arranged to determine a precise position based on the measured carrier phase of the received satellite signals and the received precise correction data in a precise correction mode. At the reference receiver, an offset module can determine a base offset vector between the precise position and a reference RTK position for the reference receiver. At the reference receiver, a wireless communications device is capable of transmitting, via an RTK signal, RTK correction data.

17 Claims, 11 Drawing Sheets

(51) Int. Cl.
*G01S 19/43* (2010.01)
*G01S 19/42* (2010.01)
*G01S 19/45* (2010.01)
*G01S 19/13* (2010.01)

(52) U.S. Cl.
CPC .............. *G01S 19/13* (2013.01); *G01S 19/42* (2013.01); *G01S 19/45* (2013.01)

(58) Field of Classification Search
USPC ............ 342/357.27, 357.31, 357.51, 357.28, 342/357.24, 357.44
See application file for complete search history.

(56) References Cited

U.S. PATENT DOCUMENTS

| | | | |
|---|---|---|---|
| 5,914,685 A | 6/1999 | Kozlov et al. | |
| 5,916,300 A | 6/1999 | Kirk et al. | |
| 6,266,584 B1 | 7/2001 | Hur-Diaz et al. | |
| 6,373,432 B1 | 4/2002 | Rabinowitz et al. | |
| 6,456,233 B1 | 9/2002 | Zhodzishky et al. | |
| 6,810,324 B1 | 10/2004 | Nadkarni | |
| 6,943,728 B2 * | 9/2005 | Han | G01S 19/44 342/357.31 |
| 6,961,018 B2 | 11/2005 | Heppe et al. | |
| 7,071,870 B2 * | 7/2006 | Sharpe | G01S 19/44 342/357.31 |
| 7,119,741 B2 * | 10/2006 | Sharpe | G01S 19/44 342/357.31 |
| 7,212,155 B2 | 5/2007 | Hatch et al. | |
| 7,247,950 B2 | 7/2007 | Fujisawa et al. | |
| 7,248,211 B2 | 7/2007 | Hatch et al. | |
| 7,298,319 B2 | 11/2007 | Han et al. | |
| 7,511,661 B2 | 3/2009 | Hatch et al. | |
| 7,663,539 B2 * | 2/2010 | Han | G01S 19/44 342/357.27 |
| 7,670,555 B2 | 3/2010 | Hoover et al. | |
| 7,679,555 B2 * | 3/2010 | Dai | G01S 19/41 342/357.31 |
| 7,961,143 B2 | 6/2011 | Dai et al. | |
| 8,140,223 B2 | 3/2012 | Whitehead et al. | |
| 8,368,590 B2 | 2/2013 | Vollath et al. | |
| 8,368,591 B2 | 2/2013 | Talbot et al. | |
| 8,427,365 B2 | 4/2013 | Dai et al. | |
| 8,542,146 B2 | 9/2013 | Vollath | |
| 8,600,601 B2 | 12/2013 | Kellar et al. | |
| 8,766,848 B2 | 7/2014 | Dai et al. | |
| 8,849,481 B1 | 9/2014 | Gavrilets et al. | |
| 9,057,780 B2 | 6/2015 | Bar-Sever et al. | |
| 9,116,228 B2 * | 8/2015 | Ellum | G01S 19/04 |
| 9,128,176 B2 | 9/2015 | Seeger | |
| 9,146,319 B2 | 9/2015 | Leandro | |
| 2005/0151683 A1 | 7/2005 | Sharpe et al. | |
| 2006/0017611 A1 * | 1/2006 | Hatch | G01S 5/0045 342/357.31 |
| 2006/0290566 A1 | 12/2006 | Syrjarinne et al. | |
| 2007/0001900 A1 | 1/2007 | Heppe et al. | |
| 2008/0074319 A1 | 3/2008 | Han et al. | |
| 2009/0102708 A1 | 4/2009 | Dai et al. | |
| 2011/0187590 A1 * | 8/2011 | Leandro | G01S 19/40 342/357.27 |
| 2011/0210889 A1 | 9/2011 | Dai et al. | |
| 2011/0267226 A1 * | 11/2011 | Talbot | G01S 19/44 342/357.27 |
| 2011/0307138 A1 | 12/2011 | Kellar et al. | |
| 2012/0029810 A1 * | 2/2012 | Dai | G01C 21/20 701/489 |
| 2012/0163419 A1 * | 6/2012 | Seeger | G01S 19/04 375/144 |
| 2012/0306694 A1 | 12/2012 | Chen et al. | |
| 2013/0271318 A1 | 10/2013 | Doucet et al. | |
| 2014/0015712 A1 | 1/2014 | Leandro et al. | |
| 2014/0062778 A1 | 3/2014 | Ashjaee et al. | |
| 2014/0378171 A1 | 12/2014 | Rudow et al. | |
| 2015/0161872 A1 | 6/2015 | Beaulieu et al. | |
| 2016/0377736 A1 | 12/2016 | Zeitzew et al. | |
| 2017/0269216 A1 * | 9/2017 | Dai | G01S 19/44 |
| 2017/0269231 A1 | 9/2017 | Dai et al. | |
| 2017/0299728 A1 | 10/2017 | Lie et al. | |
| 2017/0299730 A1 | 10/2017 | Lie et al. | |
| 2018/0113473 A1 | 4/2018 | Webber et al. | |
| 2018/0210091 A1 * | 7/2018 | Di Federico | G01S 19/07 |
| 2019/0120973 A1 | 4/2019 | Martin et al. | |

FOREIGN PATENT DOCUMENTS

| | | |
|---|---|---|
| JP | 2009281737 A | 12/2009 |
| WO | 2010074777 A1 | 7/2010 |

OTHER PUBLICATIONS

The International Search Report and the Written Opinion of the International Searching Authority issued in counterpart application No. PCT/US16/39805, dated Sep. 14, 2016 (13 pages).

The International Search Report and the Written Opinion of the International Searching Authority issued in counterpart application No. PCT/US16/39826, dated Sep. 14, 2016 (10 pages).

The International Search Report and the Written Opinion of the International Searching Authority issued in counterpart application No. PCT/US16/39817, dated Oct. 5, 2016 (12 pages).

Chassagne, Olivier. "The Future of Satellite Navigation, One-Centimeter Accuracy with PPP", GNSS Forum, pp. 51-54, Mar.-Apr. 2012 [online] [retrieved on Aug. 31, 2016]. Retrieved from the Internet: <URL:http://www.insidegnss.com/auto/marapr12-Chassagne.pdf>.

Choy, Suelynn."GNSS Precise Point Positioning: A Fad or the Future of Satellite Navigation and Positioning?" Lecture slides [online].School of Mathematical and Geospatial Sciences Royal Melbourne Institute of Technology University, Australia, 2014 [retrieved on Aug. 31, 2016]. Retrieved from the Internet: <URL:http://www.fig.net/resources/proceedings/fig_proceedings/fig2014/ppt/TS05A/Choy.pdf>.

Murfin, Tony. "Hexagon's Acquisition of Veripos: Why Did This Go Down?" GPS World [online], Apr. 16, 2014 [retrieved on Aug. 31, 2016]. Retrieved from the Internet: <URL:http://gpsworld.com/hexagons-acquisition-of-veripos-why-did-this-go-down/>.

Murfin, Tony. "Look, No Base-Station!—Precise Point Positioning (PPP)." GPS World [online], Mar. 20, 2013 [retrieved Aug. 31, 2016]. Retrieved from the Internet: <URL:http://gpsworld.com/look-no-base-station-precise-point-positioning-ppp/>.

Laurichesse, Denis. "Innovation: Carrier-Phase Ambiguity Resolution, Handling the Biases for Improved Triple-Frequency PPP Convergence." GPS World, Apr. 3, 2015 [online], [retrieved Aug. 31, 2016]. Retrieved from the Internet: <URL:http://gpsworld.com/innovation-carrier-phase-ambiguity-resolution/>.

Dixon, Kevin. "StarFire: A Global SBAS for Sub-Decimeter Precise Point Positioning." NavCom Technology Inc., ION GNSS 19th International Technical Meeting of the Satellite Division [online], Sep. 26-29, 2006 [retrieved on Aug. 31, 2016]. Retrieved from the Internet: <URL:http://www.gdgps.net/system-desc/papers/starfire.pdf>.

Shi, J. and Gao, Y. "A Comparison of Three PPP Integer Ambiguity Resolution Methods." GPS Solutions 18.4 [online], 2013, pp. 519-528 [retrieved on Aug. 31, 2016]. Retrieved from the Internet: <URL:http://link.springer.com/article/10.1007/s10291-013-0348-2>.

Leandro, R., et al. "RTX Positioning: The Next Generation of cm-accurate Real-Time GNSS Positioning." Trimble Terrasat GmbH [online brochure], Sep. 2012 [retrieved on Aug. 31, 2016]. Retrieved from the Internet: <URL:https://www.trimble.com/positioning-services/pdf/WhitePaper_RTX.pdf>.

Goode, Matthew. "New Developments in Precise Offshore Positioning." Ocean Business / Offshore Survey [online presentation], Apr. 15-16, 2015, Southampton, United Kingdom [retrieved on Aug. 31, 2016]. Retrieved from the Internet: <URL:http://www.oceanbusiness.com/wp-content/uploads/2015/04/1410_MatthewGoode.pdf>.

(56) References Cited

OTHER PUBLICATIONS

Ott, Lee. "Use of Four GNSS Systems in Operational Precise Point Positioning Service." Furgo Satellite Positioning [online presentation], 2015 [retrieved on Aug. 31, 2016]. Retrieved from the Internet: <URL:http://www.gps.gov/cgsic/meetings/2015/ott.pdf>.

Toor, Pieter. "Munich Satellite Navigation Summit 2014." Veripos, Ltd. [online presentation], Mar. 26, 2014 [retrieved on Aug. 31, 2016]. Retrieved from the Internet: <URL:URL:http://www.terrastar.net/files/docs/Munich_Summit_2014_-_PPP_Session_-_Pieter_Toor_-_VERIPOS.pdf>.

Jokinen, AS. "Enhanced Ambiguity Resolution and Integrity Monitoring Methods for Precise Point Positioning." Centre for Transport Studies, Department of Civil and Environmental Engineering, Imperial College London [online thesis], Aug. 2014 [retrieved on Aug. 31, 2016]. Retrieved from the Internet: <URL:https://spiral.imperial.ac.uk/bitstream/10044/1/24806/1/Jokinen-A-2014-PhD-Thesis.pdf>.

"Real-time Service." International GNSS Service [online article], 2015 [retrieved on Aug. 31, 2016]. Retrieved from the Internet: <URL:http://www.igs.org/rts>.

"Introducing the IGS Real-Time Service (RTS)." International GNSS Service [online], 2015 [retrieved on Aug. 31, 2016]. Retrieved from the Internet <URL:ftp://igs.org/pub/resource/pubs/IGS_Real_Time_Service-131031.pdf>.

Schrock, Gavin, "PPP: IGS Announces The Launch of RTS-IGS." xyHt [online], Apr. 20, 2015 [retrieved on Aug. 31, 2016]. Retrieved from the Internet: <URL:http://www.xyht.com/professional-surveyor-archives/ppp-igs-announces-the-launch-of-rts-igs/>.

Laurichesse, D., Mercier, F., and Berthias, JP. "Real-time PPP with Undifferenced Integer Ambiguity Resolution, Experimental Results." Proceedings of the ION GNSS [online] Sep. 21-24, 2010 [retrieved on Aug. 31, 2016]. Retrieved from the Internet <URL:http://www.ppp-wizard.net/Articles/laurichesse_ion_gnss_2010_bdp.pdf>.

Blewitt, Geoffrey. "Carrier Phase Ambiguity Resolution for the Global Positioning System Applied to Geodetic Baselines up to 2000 km." Journal of Geophysical Research [online], vol. 94, No. B8, pp. 10187-10203, Aug. 10, 1989 [retrieved on Aug. 31, 2016]. Retrieved from the Internet: <URL:http://www.colorado.edu/ASEN/asen6090/blewitt.pdf#page=1&zoom=auto,-154,811>.

Banville, Simon. "Ambiguity Resolution." BlackDot GNSS [online], Apr. 25, 2015 [retrieved on Sep. 6, 2016]. Retrieved from the Internet <URL:http://www.blackdotgnss.com/2015/04/25/ambiguity-resolution/>.

Teunissen, PJG. "Towards a Unified Theory of GNSS Ambiguity Resolution." Journal of Global Positioning Systems [online], vol. 2, No. 1, pp. 1-12, 2003 [retrieved on Sep. 6, 2016]. Retrieved from the Internet <URL:http://citeseerx.ist.psu.edu/viewdoc/download?doi=10.1.1.454.4430&rep=rep1&type=pdf>.

Teunissen, PJG. "Least-Squares Estimation of the Integer GPS Ambiguities." International Association of Geodesy General Meeting, Section IV: Theory and methodology, Beijing, China, 1993 [online] retrieved on Sep. 6, 2016]. Retrieved from the Internet: <URL:http://citeseerx.ist.psu.edu/viewdoc/download?doi=10.1.1.475.9393&rep=rep1&type=pdf>.

"Hemisphere GNSS Debuts Atlas GNSS Correction Service." GPS World Staff. GPS World [online], Jun. 15, 2015 [retrieved on Sep. 6, 2016]. Retrieved from the Internet: <URL:http://gpsworld.com/hemisphere-gnss-debuts-atlas-gnss-correction-service/>.

Teunissen, PJG. "GNSS Ambiguity Bootstrapping: Theory and Application." Proceedings of International Symposium on Kinematic Systems in Geodesy, Geomatics and Navigation [online], pp. 246-254, Jun. 2001 [retrieved on Nov. 16, 2016]. Retrieved from the Internet <URL:http://www.ucalgary.ca/engo_webdocs/SpecialPublications/KIS%2001/PDF/0503.PDF>.

Teunissen, PJG. "Theory of Integer Equivariant Estimation with Application to GNSS." Journal of Geodesy [online], vol. 77, No. 7-8, pp. 402-410, 2003 [retrieved on Nov. 16, 2016]. Retrieved from the Internet <URL:http://link.springer.com/article/10.1007/s00190-003-0344-3>.

Wen, Zhibo, et al. "Best Integer Equivariant Estimation for Precise Point Positioning." Institute for Communications and Navigation 2012 Proceedings [online], pp. 279-282, Sep. 12-14, 2012 [retrieved on Sep. 6, 2016]. Retrieved from the Internet <URL:http://ieeexplore.ieee.org/xpls/abs_all_jsp?arnumber=6338525&tag=1>.

Shi, J. and Gao, Y. "A Fast Integer Ambiguity Resolution Method for PPP." Proceedings of the ION GNSS [online], Nashville, TN, pp. 3728-3734, Sep. 17-21, 2012 [retrieved on Nov. 16, 2016]. Retrieved from the Internet <URL:https://www.ion.org/publications/abstract.cfm?articleID=10548>.

Teunissen, PJG. "The Least-squares Ambiguity Decorrelation Adjustment: A Method for Fast GPS Integer Ambiguity Estimation." Journal of Geodesy [online], vol. 70, No. 1-2 pp. 65-82, 1995 [retrieved on Nov. 16, 2016]. Retrieved from the Internet <URL:http://link.springer.com/article/10.1007/BF00863419>.

De Jonge, P. and Tiberius, C. "The LAMBDA Method for Integer Ambiguity Estimation: Implementation Aspects." Publications of the Delft Computing Centre [online], LGR-Series No. 12, pp. 1-47, Aug. 1996 [retrieved on Sep. 6, 2016]. Retrieved from the Internet <URL:http://www.citg.tudelft.nl/fileadmin/Faculteit/CiTG/Over_de_faculteit/Afdelingen/Afdeling_Geoscience_and_Remote_Sensing/pubs/lgr12.pdf>.

Chang, XW., Yang, X. and Zhou, T. "MLAMBDA: A Modified LAMBDA Method for Integer Least-squares Estimation." Journal of Geodesy [online], vol. 79, No. 9, pp. 552-565, Dec. 2005 [retrieved on Sep. 6, 2016]. Retrieved from the Internet <URL:http://www.cs.mcgill.ca/~chang/pub/MLAMBDA.pdf>.

Baroni, L. and Kuga, HK. "Evaluation of Two Integer Ambiguity Resolution Methods for Real Time GPS Positioning." WSEAS Transactions on Systems 8.3, pp. 323-333, Mar. 2009 [retrieved on Sep. 6, 2016]. Retrieved from the Internet <URL:https://www.researchgate.net/profile/Helio_Kuga/publication/41146341_Evaluation_of_Two_Integer_Ambiguity_Resolution_Methods_for_Real_Time_GPS_Positioning/links/543687fe0cf2bf1f1f2bd8d1.pdf>.

Verhagen, Sandra. "The GNSS Integer Ambiguities: Estimation and Validation." Delft Institute of Earth Observation and Space Systems, Delft University of Technology, Jan. 31, 2005 [retrieved on Sep. 6, 2016]. Retrieved from the Internet <URL:http://repository.tudelft.nl/islandora/object/uuid:07c6f2be-3a70-42aa-97b3-894a5770454d/?collection=research>.

Li, P. and Zhang, X. "Precise Point Positioning With Partial Ambiguity Fixing." Sensors [online journal], vol. 15, No. 6, pp. 13627-13643, Jun. 10, 2015 [retrieved on Sep. 6, 2016]. Retrieved from the Internet:<URL:http://www.mdpi.com/1424-8220/15/6/13627/htm>.

Verhagen, Sandra. et al. "GNSS Ambiguity Resolution: Which Subset to Fix?" IGNSS Symposium 2011, International Global Navigation Satellite Systems Society, University of New South Wales, Sydney, Australia, Nov. 15-17, 2011 [retrieved on Sep. 6, 2016]. Retrieved from the Internet:<URL:http://repository.tudelft.nl/islandora/object/uuid:075deb5b-5253-4daf-97be-f7126519612b/?collection=research>.

Pan, L., Cai, C., Santerre, R. and Zhu, J. "Combined GPS/GLONASS Precise Point Positioning with Fixed GPS Ambiguities." Sensors [online journal], vol. 14, No. 9, pp. 17530-17547, Sep. 18, 2014 [retrieved on Sep. 6, 2016]. Retrieved from the Internet: <URL:http://www.mdpi.com/1424-8220/14/9/17530/htm>. <DOI:10.3390/s140917530>.

Gratton, L., Joerger, M. and Pervan, B. "Carrier Phase Relative RAIM Algorithms and Protection Level Derivation." Journal of Navigation [online], vol. 63, No. 2, pp. 215-231, Apr. 1, 2010 [retrieved on Sep. 6, 2016]. Retrieved from the Internet: <URL:https://www.cambridge.org/core/journals/journal-of-navigation/article/div-classtitlecarrier-phase-relative-raim-algorithms-and-protection-level-derivationdiv/AEA4489E97E3C131EBD3E2184B3F0DD7> <DOI:10.1017/S0373463309990403>.

Traugott, JP. "Precise flight trajectory reconstruction based on time-differential GNSS carrier phase processing" [online] Verlag Dr. Hut; 2011, [retrieved on Jan. 20, 2017]. [Retrieved from the Internet: URL <https://mediatum.ub.tum.de/doc/1002062/1002062.pdf>.

(56) References Cited

OTHER PUBLICATIONS

NovAtelCORRECT. NovAtel Inc. [online brochure], Nov. 2015 [retrieved on Sep. 6, 2016]. Retrieved from the Internet: <URL: http://www.novatel.com/assets/Documents/Papers/NovAtelCORRECT-Brochure.pdf>.

Reußnerr, N. and Wanniger, L. "GLONASS Inter-frequency Code Biases and PPP Carrier-Phase Ambiguity Resolution." Geodetic Institute, Technische Universitat Dresden, IGS Workshop, Jul. 2012 [retrieved Aug. 31, 2016]. Retrieved from the Internet: <URL:https://tu-dresden.de/bu/umwelt/geo/gi/gg/ressourcen/dateien/veroeffentlichungen/gs2012.pdf?lang=en>.

Sleewagen, J. et al. "Digital versus Analog: Demystifying GLONASS Inter-Frequency Carrier Phase Biases." Inside GNSS [online], May/Jun. 2012 [retrieved Aug. 31, 2016]. Retrieved from the Internet:<URL:http://www.insidegnss.com/auto/mayjune12-Sleewaegen.pdf>.

Carcanague, S. et al. "Finding the Right Algorithm Low-Cost, Single-Frequency GPS/GLONASS RTK for Road Users." Inside GNSS [online], vol. 8 No. 6, pp. 70-80, Nov./Dec. 2013 [retrieved Aug. 31, 2016]. Retrieved from the Internet:<URL:http://www.insidegnss.com/auto/novdec13-WP.pdf>.

Wang, J. and Feng, Y. "Reliability of Partial Ambiguity Fixing with Multiple GNSS Constellations." Journal of Geodesy [online], vol. 87, No. 1, pp. 1-14, Jun. 12, 2012 [retrieved Aug. 31, 2016]. Retrieved from the Internet:<URL: http://link.springer.com/article/10.1007/s00190-012-0573-4> <DOI:10.1007/s00190-012-0573-4>.

Petovello, Mark. "GNSS Solutions: Absolutely Relative Positioning", Solutions, InsideGNSS [online], p. 36, May-June. Ed., 2011, [retrieved Jan. 20, 2017]. [Retrieved from the Internet: URL <http://www.insidegnss.com/auto/mayjune11-Solutions.pdf>.

Ding, W. and Wang, J. "Precise Velocity Estimation with a Stand-Alone GPS Receiver", Journal of Navigation, 64 (2), pp. 311-325, 2011, DOI: 10.1017/S0373463310000482.

Kirkko-Jaakkola, M. et al. "A RAIM Approach to GNSS Outlier and Cycle Slip Detection Using L1 Carrier Phase Time-differences", IEEE Workshop on Signal Processing Systems [online], 2009, pp. 273-278, DOI: 10.1109/SIPS.2009.5336264.

Elsobeiey, M. and El-Rabbany, M. "Convergence Time Improvement of Precise Point Positioning", TS04J—Geodetic Applications in Various Situations, 5249 [online], [retrieved on Jan. 20, 2017]. [Retrieved from the Internet: URL <http://www.fig.net/resources/proceedings/fig_proceedings/fig2011/papers/ts04j/ts04j_elsobeiey_elrabbany_5249.pdf>.

Geng, J. et al., "Towards PPP-RTK: Ambiguity resolution in real-time precise point positioning", Advances in Space Research, vol. 47, Issue 10, pp. 1664-1673, GNSS Remote Sensing-2, Institute of Engineering Surveying and Space Geodesy, The University of Nottingham, Nottingham NG7 2TU, UK, May 17, 2011.

Trimble RTX Technology for Infrastructure Applications, An Innovative New Approach for Worldwide Precise Point Positioning [online], TRIMBLE, 2012 [retrieved on Jun. 20, 2016]. Retrieved from the Internet: <URL: https://www.trimble.cominfrastructurepdf/022506-160_RTX_Technology_Bro_0912_LR_pbp.pdf>.

Trimble XFill RTK, White Paper [online]. Trimble Survey Division, Sep. 2012, Westminster, CO, USA [retrieved on Jun. 20, 2016]. Retrieved from the Internet: <URL: http://www.coudere.be/downloads/producten/Trimble%20xFill%20White%20Paper.pdf>.

Search Report issued in counterpart application No. EP16818592.4, dated Feb. 21, 2019 (12 pages).

Search Report issued in counterpart application No. EP16818597.3, dated Feb. 21, 2019 (8 pages).

Search Report issued in counterpart application No. EP16818601.3, dated Feb. 19, 2019 (9 pages).

Search Report issued in related application No. EP16818482.8, dated Feb. 19, 2019 (14 pages).

Kaplan and Hegarty, Understanding GPS, Principles and Applications (Second Ed., 2006) at pp. 395-396.

\* cited by examiner

SATELLITE NAVIGATION RECEIVER AND METHOD FOR SWITCHING BETWEEN REAL-TIME KINEMATIC MODE AND PRECISE POSITIONING MODE

RELATED APPLICATIONS

This document (including the drawings) claims priority and the benefit of the filing date based on U.S. provisional application No. 62/186,009, filed on Jun. 29, 2015 and U.S. provisional application No. 62/219,880, filed on Sep. 17, 2015 under 35 U.S.C. § 119, where the provisional applications are hereby incorporated by reference herein.

FIELD OF THE DISCLOSURE

This disclosure relates to a satellite navigation receiver and method for (seamless or smooth, accurate) switching between a real-time kinematic mode and a precise positioning mode.

BACKGROUND

In some prior art, a satellite navigation receiver may transition between a real-time kinematic (RTK) mode and a precise positioning mode of position estimation. To operate in the RTK mode, the receiver requires locally available RTK signal that is encoded with RTK correction data. If the RTK signal is interrupted, corrupted or lost, the RTK mode may be temporarily unavailable and the receiver may be transitioned to a precise positioning mode. However, the transition between the RTK mode the precise positioning mode may be abrupt or lead to a jump or discontinuity in the position of the receiver or a vehicle associated with the receiver. Moreover, after RTK signal interruption, corruption or loss, in certain prior art the satellite receiver can only provide accuracy consistent with the lost RTK mode for a maximum time period (e.g., fifteen minutes). If the RTK signal is not restored or recovered within the maximum time period, then the receiver may need to resort to a location-determining mode with reduced accuracy. Accordingly, there is a need for a satellite navigation receiver and method for (seamless or smooth, accurate) switching between real-time kinematic mode and precise positioning mode of position estimation; that supports longer outage periods for the RTK signal.

SUMMARY

In accordance with one embodiment, a receiver or a method for operating a satellite navigation receiver with an offset vector or reference frame compensation to provide seamless switching between a real-time kinematic (RTK) mode and a precise positioning mode (e.g., precise point positioning, PPP) mode. Further, once operating in the precise positioning mode, high accuracy of position estimates of the mobile receiver can be maintained for an indefinite time period in certain embodiments. A system and method for operating one or more satellite navigation receiver comprises a measurement module of a reference receiver for measuring a carrier phase of the received satellite signals. A correction wireless device is adapted to receive, at the reference receiver, a precise signal encoded with precise correction data. A precise positioning estimator of the reference receiver is arranged to determine a precise position based on the measured carrier phase of the received satellite signals and the received precise correction data in a precise correction mode. At the reference receiver, an offset module can determine a base offset vector between the precise position and a reference RTK position for the reference receiver. At the reference receiver, a wireless communications device is capable of transmitting, via an RTK signal, RTK correction data, which comprises a representation of the base offset vector, to a mobile receiver.

BRIEF DESCRIPTION OF THE DRAWINGS

FIG. 4A shows the navigation positioning estimator in greater detail than FIG. 3.

Like reference numbers in different drawings indicate like or similar elements, steps or procedures.

DETAILED DESCRIPTION

Figure 1A:
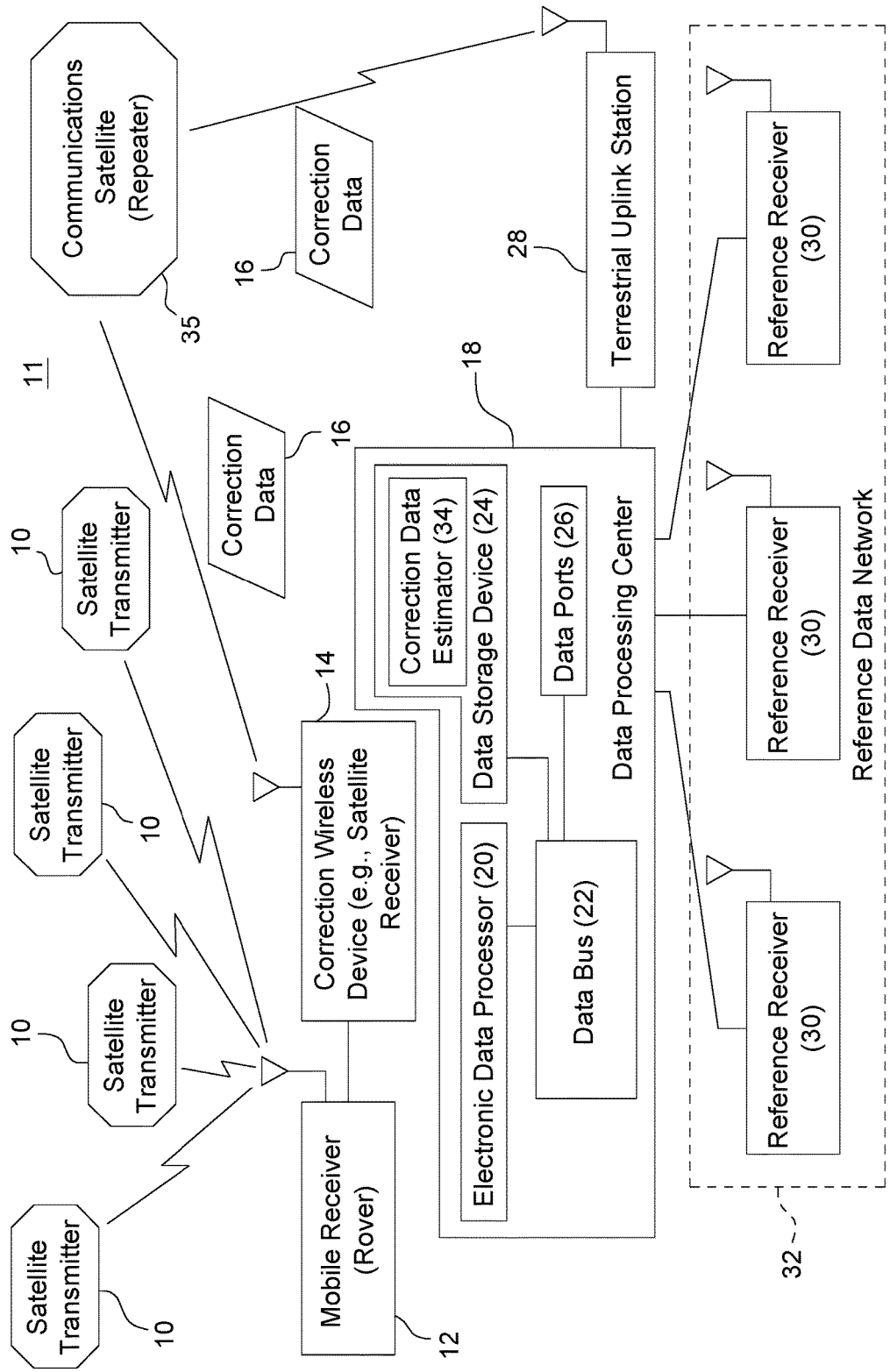
FIG. 1A is a block diagram of one embodiment of a satellite navigation data processing center that provides correction data via a communications satellite to a mobile receiver.

In any of the above referenced drawings of this document, any arrow or line that connects any blocks, components, modules, multiplexers, memory, data storage, accumulators, data processors, electronic components, oscillators, signal generators, or other electronic or software modules may comprise one or more of the following items: a physical path of electrical signals, a physical path of an electromagnetic signal, a logical path for data, one or more data buses, a circuit board trace, a transmission line; a link, call, communication, or data message between software modules, programs, data, or components; or transmission or reception of data messages, software instructions, modules, subroutines or components.

In one embodiment, the system, method and receiver disclosed in this document may comprise a computer-implemented system, method or receiver in which one or more data processors process, store, retrieve, and otherwise manipulate data via data buses and one or more data storage devices (e.g., accumulators or memory) as described in this document and the accompanying drawings. As used in this document, "configured to, adapted to, or arranged to" mean that the data processor or receiver is programmed with suitable software instructions, software modules, executable code, data libraries, and/or requisite data to execute any referenced functions, mathematical operations, logical operations, calculations, determinations, processes, methods, algorithms, subroutines, or programs that are associated with one or more blocks set forth in FIG. 1A, FIG. 1B, FIG. 3 and/or any other drawing in this disclosure. Alternately, separately from or cumulatively with the above definition, "configured to, adapted to, or arranged to" can mean that the receiver comprises one or more components described herein as software modules, equivalent electronic hardware modules, or both to execute any referenced functions, mathematical operations, calculations, determinations, processes, methods, algorithms, subroutine.

The global navigation satellite systems (GNSS) including GPS, GLONASS, BEIDOU, GALILEO, QZSS, IRNSS and SBAS, use satellites in space to locate the position (e.g., three dimensional coordinates) of GNSS receivers, or their antennas, on or above Earth. Typically, both pseudo-range and integrated carrier phase GNSS measurements are available within a civilian GNSS receiver for each carrier signal of each GNSS satellite that is being tracked. The pseudo-range measurement records the apparent time duration taken for the relevant code to travel from the satellite to the receiver. The time duration equals the time the signal arrives at the receiver according to the receiver clock minus the time the signal left the satellite according to the satellite clock.

In a GNSS receiver, the carrier phase measurement can be obtained by integrating a reconstructed carrier of the signal as it arrives at the receiver, or in accordance with other measurement techniques. The carrier phase measurement is a measure of a transit time difference as determined by the time the signal left the satellite according to the satellite clock and the time it arrives at the receiver according to the receiver clock. However, because the initial number of whole cycles in transit between the satellite and the receiver, when the receiver starts tracking the carrier phase of the signal, is not known, the transit time difference obtained from the carrier phase will typically be in error by a multiple (e.g., plus or minus one integer or its equivalent wavelength) carrier cycles. Accordingly, there is a whole-cycle ambiguity in the carrier phase measurement for the carrier phase between the receiver and each satellite, until it is resolved through various procedures.

The range or distance between a GNSS receiver and each of a multitude of observable satellites is calculated by multiplying each signal's travel time from the satellite to the GNSS receiver by the speed of light. These ranges are usually referred to as pseudo-ranges because the receiver clock generally has a significant time error which causes a common bias in the measured range with respect to each satellite in a set of satellite signals received by the receiver. By using differenced measurements, the common bias from receiver clock error is solved for along with the position coordinates of the receiver as part of the normal navigation computation. Various other factors can also lead to errors or noise in the calculated range, including ephemeris error, satellite clock timing error, atmospheric effects, receiver noise and multipath error. In standalone GNSS navigation, where the receiver obtains code and/or carrier-phase ranges from multiple satellites without the benefit of corrections from any reference stations, the receiver is very limited in methods available to reduce the errors or noises in the ranges.

To eliminate or reduce systematic errors, differential operations are typically used in GNSS applications. Differential GNSS operations typically involve one or more reference receivers located at known sites (sometimes called base stations) together with a communication link between the user's mobile receiver and the reference receiver. The reference receivers generate correction data associated with some or all of the above errors and the correction data is sent to the user receiver over the communication link. The mobile receiver then applies the correction data to its own carrier phase measurements or position estimate and thereby obtains a more accurate computed position. The correction data from a respective reference receiver can be in the form of corrections to the reference receiver position determined at the reference site or in the form of corrections to the specific GNSS satellite clock and/or orbit data. Differential operations using carrier-phase measurements are often referred to as real-time kinematic (RTK) positioning/navigation operations.

The fundamental concept of Differential GNSS (DGNSS) is to take advantage of the spatial and temporal correlations of the errors inherent in the GNSS measurements. For short baseline or separation between the mobile receiver and the reference receiver, the mobile receiver can use the correction data to cancel or significantly mitigate most of the noise sources in the pseudo-range and/or carrier phase measurements. The amount of mitigation depends upon the correlation between the error sources at the mobile receiver and reference receiver. While the GNSS satellite clock timing error, which appears as a bias on the pseudo-range or carrier phase measurement, is perfectly correlated between the reference receiver and the mobile receiver, most of the other error factors are either not correlated or the correlation diminishes as a function of distance between the mobile receiver and the reference receiver.

A number of different techniques have been developed to obtain high-accuracy differential navigation using the GPS carrier-phase measurements. The technique with the highest accuracy is the real-time kinematic (RTK) technique, which yields a typical accuracy of about one-centimeter. However, to obtain that accuracy, the mobile receiver needs to determine the whole-cycle ambiguity in the differential carrier-phase measurements. When the distance between the user's mobile receiver and the reference receiver (baseline distance) is short, the RTK technique is highly advantageous because in this case, the whole-cycle ambiguity can be resolved not only accurately but also quickly. On the other hand, when the baseline distance is more than a few tens of kilometers, it may become impossible to determine the whole-cycle ambiguity and the normal RTK accuracy cannot be achieved. Another limitation of the RTK technique is that it requires a local radio link to be maintained between the reference receiver and the navigation receiver to supply timely correction or measurement data.

To overcome the error sources within the DGNSS system in wide-area applications, various regional, wide-area, or global DGPS (sometimes referred to as Precise Point Positioning PPP) techniques have been developed. The typical PPP includes a network of multiple reference stations in communication with a computational center or hub. The computational center determines precise correction data based upon the known locations of the reference stations and the carrier phase measurements taken by them. The computed correction data are then transmitted to users via a communication link such as satellite, phone, or radio. By using multiple reference stations, PPP provides more accurate estimates of the precise correction data.

Precise positioning refers to precise point positioning (PPP) or similar forms of providing accurate position estimates based on differential correction data or correction data such as precise clock and orbit corrections. Precise point positioning (PPP) means: (1) use precise satellite orbit and clock corrections, rather than normal satellite broadcast information (ephemeris data), to determine a relative position or absolute position of a mobile user satellite navigation receiver without any local reference satellite stations to provide differential correction, or (2) use precise satellite orbit and clock corrections, ordinary broadcast information (ephemeris data) and with differential correction data, measured range data, or carrier phase data from one or more local reference stations. Although the resulting positions can be accurate within a few centimeters using state-of-the-art algorithms, conventional precise point positioning can take a long convergence time of up to tens of minutes to determine the ambiguity integer or floating ambiguity value to achieve the advertised steady-state accuracy is typically a limiting factor in their applicability. Here, the method and receiver of this disclosure does not aim to improve the convergence time of the PPP or determination of an absolute position based PPP. However, when working in conjunction with a PPP system, the receiver or method of this disclosure provides the opportunity to achieve the steady-state level precision for relative position prior to complete convergence or determination of an ambiguity integer or floating ambiguity value.

The PPP techniques that employ a carrier-phase differential method can achieve very high navigational accuracy. The PPP differential techniques are typically characterized by reliable long-distance communication links or by reliable satellite communication links. Precise correction data can generally be communicated to navigation receivers without significant interruption. However, certain PPP techniques treat the whole-cycle ambiguities as a real-valued (non-integer) variable and solve for a "floating ambiguity," which is usually very poorly defined until measurement data covering a time interval of significant satellite geometry change have been obtained. Thus, in a PPP application, a time interval as long as approximately thirty to approximately sixty minutes may be required to solve for the "floating ambiguity" with sufficient accuracy to yield a navigated position with a reliable accuracy of less than (i.e., better than) a few centimeters.

In FIG. 1A, a mobile receiver 12 and a reference receiver 30 each comprise a location-determining receiver or satellite receiver, such as a Global Navigation Satellite System (GNSS) receiver. The mobile receiver 12 and each reference receiver 30 are capable of making carrier phase measurements that are subject to ambiguities, such as integer ambiguities, in the cycles of each received satellite signal. The receiver (12, 30) determines or resolves ambiguities of carrier phase measurements of the respective received satellite signals to estimate accurately the precise position or coordinates of the receiver. Although the code phase or pseudo-range measurements of the receiver (12, 30) are not associated with integer ambiguities in the cycles of the received satellite, code phase measurements do not provide the centimeter level position accuracy required for certain applications (e.g., vehicle navigation).

As used throughout this document, ambiguities are often specific to the context of particular equations which relate to observations from one or more receivers of carrier phase signals from one or more satellites. Accordingly, it is possible to have wide-lane (WL) ambiguities, narrow-lane (NL) ambiguities, zero-difference (ZD) ambiguities, single-difference (SD) ambiguities, double-difference (DD) ambiguities, real-time-kinematic (RTK) ambiguities, and refraction-corrected (RC) ambiguities that relate to phase measurements from one or more receivers, or one or more satellites. In this document, any reference to ambiguity can refer to a singular ambiguity or plural ambiguities.

If the satellite navigation receiver (12, 30) can receive at least two frequencies, such as L1 and L2 frequencies, the difference of the L1 and L2 carrier phase measurements can be combined to form wide-lane (WL) measurement (e.g., with a wavelength of approximately 86.25 centimeters for Global Positioning System, GPS) and the sum of the L1 and L2 carrier phase measurements can be combined to form narrow-lane (NL) measurements (e.g., with a wavelength of approximately 10.7 centimeters). The wide-lane measurements facilitate quick and efficient resolution of wide-lane integer ambiguities, whereas the narrow-lane measurements facilitate precise and accurate resolution of narrow-lane ambiguities with minimal phase noise. The refraction-ambiguities compensate for atmospheric delay bias, such as tropospheric delay bias.

Single difference measurements (e.g., of carrier phase or code phase) are generally formed with respect to one satellite, a reference receiver 30 and a mobile receiver 12 (e.g., rover). In contrast, double difference measurements are generally formed with respect to two satellites, a reference receiver 30 and a mobile receiver 12, or by subtracting two single-difference measurements. However, certain double-difference measurements can be formed with two single-difference measurements from the same receiver at two different times and associated with a pair of satellites.

In FIG. 1A, the system comprises a constellation of satellites or satellite transmitters 10, including at least those satellites that are within view or reception range of one or more reference receivers 30 (e.g., reference GNSS receivers). In practice, reference receivers 30 (e.g., GNSS reference stations) are globally distributed at sites with good satellite geometry and visibility to a set of satellites or satellite transmitters 10. Each reference receiver 30 has a measurement module that measures observables, such as the carrier phase of one or more received satellite signals from each satellite. The reference receiver 30 may also measure the pseudo-range or code phase of a pseudo-random noise code that is encoded on one or more of the carrier signals. The reference receivers 30 receive and send measurements, ephemeris data, other observables and any information derived from the deliverables to an electronic data processing center 18 (e.g., hub). In one embodiment, each reference receiver 30 transmits (e.g., via a communications link, a communications network, a wireless channel, a communications channel, communications line, a transmission line, or otherwise) a set of carrier phase measurements of received satellite signals, and associated satellite identifiers, and ephemeris data to an electronic data processing center 18 (e.g., reference data processing hub).

The data processing center 18 or its correction data estimator 34 determines correction data in real time based on the measurements, ephemeris data, other observables and any derived information received from one or more reference receivers 30. In one embodiment, the data processing center 18 comprises an electronic data processor 20, a data storage device 24, and one or more data ports 26 that are coupled to a data bus 22. The data processor 20, the data storage device 24 and the one or more data ports 26 may communicate with each other via the data bus 22.

Software instructions and data that are stored in the data storage device 24 may be executed by the data processor 20 to implement any of the blocks, components or modules (e.g., electronic modules, software modules, or both) described in this disclosure document. The data processor 20 may comprise a microcontroller, a microprocessor, a programmable logic array, an application specific integrated circuit (ASIC), a digital signal processor, or another device for processing data, manipulating, accessing, retrieving, and storing data. A data storage device 24 may comprise electronic member, non-volatile electronic memory, an optical storage device, a magnetic storage device, or another device for storing digital or analog data on a tangible storage medium, such as an optical disk, a magnetic disk, or electronic memory. Each data port 26 may comprise a buffer memory, a transceiver or both for interfacing with other network elements, such as a reference receiver 30 or a terrestrial satellite uplink station 28.

In one embodiment, the data processing center 18 or data processor 20 or correction data estimator 34 receives the phase measurements and corresponding satellite identifiers from the reference receivers 30, reference receiver identifiers (or corresponding coordinates) and processes the phase measurements to estimate a clock bias for each satellite, or rather each satellite signal, or a corresponding clock solution for incorporation into correction data 16. As illustrated in FIG. 1A, the clock solution, clock bias or correction data 16 is provided to a terrestrial uplink station 28 or another communications link. For example, the terrestrial uplink station 28 communicates or transmits the clock solution, clock biases or correction data 16 to a communications satellite 35 (e.g., repeater).

In turn, the communications satellite 35 transmits the correction data 16 to a correction wireless device 14 (e.g., a satellite receiver or L-band satellite receiver). The correction wireless device 14 is coupled to a mobile receiver 12 (e.g., mobile GNSS receiver) or rover. The mobile receiver 12 also receives satellite signals from one or more GNSS satellites and measures the carrier phase (and code phase) of the received satellite signals. In conjunction with the phase measurements, the precise clock solutions or clock biases in the correction data 16 can be used to estimate the precise position, attitude, or velocity (e.g., solution) of the mobile receiver 12. For example, the mobile receiver 12 may employ a precise point positioning (PPP) estimate using precise clock and orbital solutions for the received signals of the satellites.

Figure 1B:
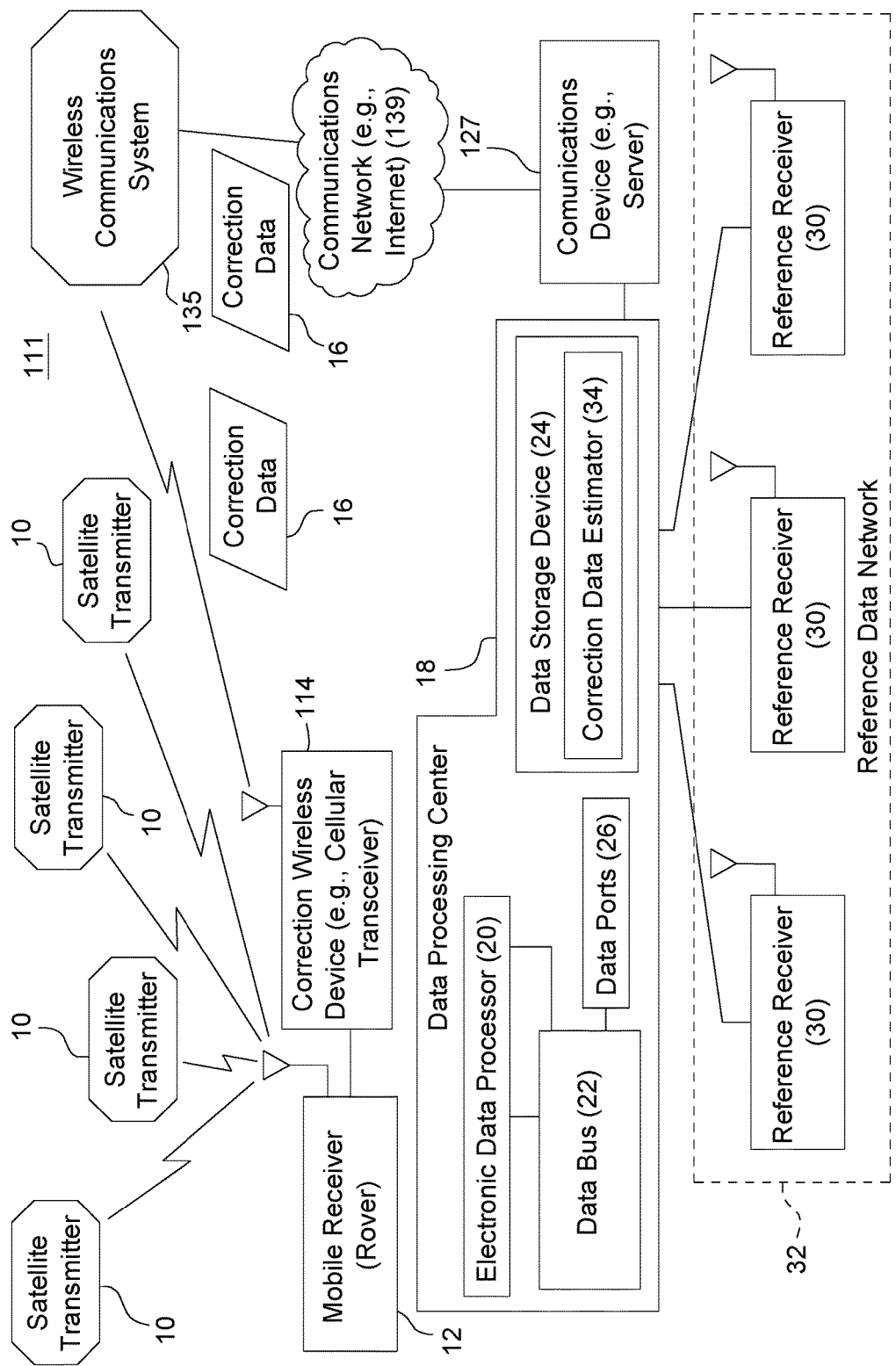
FIG. 1B is a block diagram of one embodiment of a satellite navigation data processing center that provides correction data (e.g., data packets in TCP/IP format) via a communications network (e.g., Internet) and wireless communications system to a mobile receiver.

The system of FIG. 1B is similar to the system of FIG. 1A except the system of FIG. 1B replaces the communications satellite 35 and the terrestrial uplink station 28 with a communications device 127 (e.g., server), a communications network 139 (e.g., Internet or communications link), and a wireless communications system 135. In one embodiment, the wireless communications system 135 may comprise a cellular communications system, a trunking system, a WiFi communications system, or another communications system. For example, the cellular communications system may comprise cell sites or base stations in communication with a base station controller, a router, or another mobile telephone switching office (MTSO), where the MTSO interfaces with a communications network 139, such as the Internet.

The communications network 139 may comprise microwave links, fiber optical links, the public switched telephone network (PSTN), the Internet, or another electronic communications network. In one embodiment, the communications device 127 comprises a server that formats, organizes or transmits the correction data in data packets (e.g., data packets compatible with TCP/IP Transmission Control Protocol/Internet Protocol) for transmission over the communications network 139. The communications network 139 communicates with the correction wireless device 114 (e.g., cellular transceiver) that is associated with or coupled to the mobile receiver 12.

In this document, under the precise positioning mode of FIG. 1A or FIG. 1B, the mobile receiver 12 can achieve centimeter-level accuracy positioning, by using the real-time global differential correction data 16. This correction data 16 is available and valid globally through either over satellite communications (e.g., L-Band geostationary communication satellite) in FIG. 1A or wireless communications system (e.g., cellular wireless system) in FIG. 1B. The global differential correction under a precise positioning mode, illustrated in the example of FIG. 1A, eliminates the need for local reference stations and radio communication that would otherwise be used to establish short baselines (e.g., less than approximately 20 kilometers to approximately 30 kilometers) between a reference receiver 30 and a mobile receiver 12 for precise position accuracy.

Figure 2:
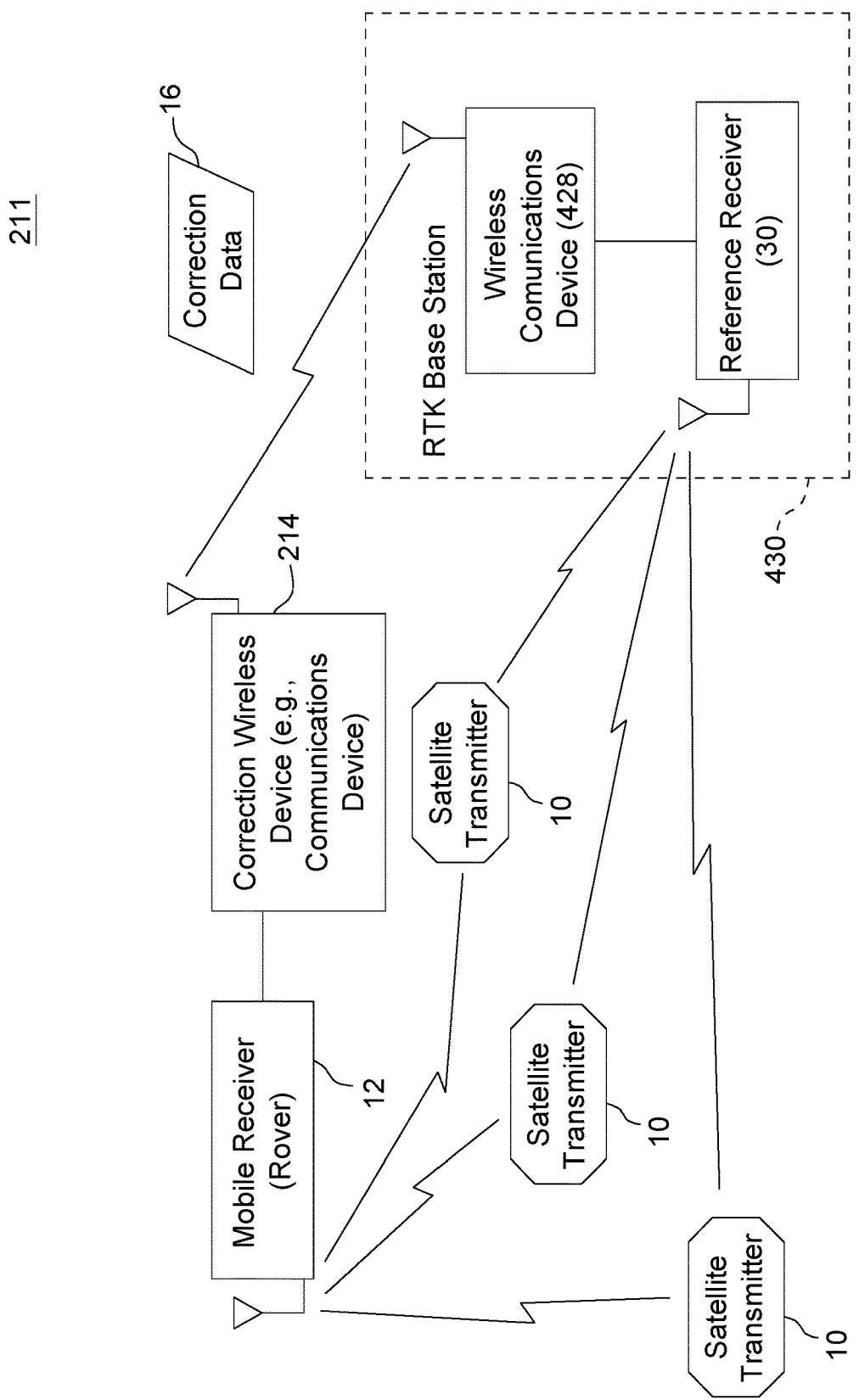
FIG. 2 is a block diagram of one embodiment of a real-time kinematic (RTK) base station that provides RTK correction data to a mobile receiver.

In comparison to FIG. 1A and FIG. 1B, FIG. 2 shows a mobile receiver 12 that operates in the real-time kinematic mode with the provisions of correction data (e.g., local RTK correction data) from a real-time kinematic (RTK) base station 430. Like reference numbers in FIG. 1A, FIG. 1B and FIG. 2 indicate like elements.

In the RTK mode, the accuracy requires visibility of the same set of satellites by the mobile receiver 12 and the reference receiver 30. Moreover, the baseline or separation distance between the mobile receiver 12 and the reference receiver 30 (or RTK base station 430) is limited to short baselines (e.g., less than 20 approximately kilometers to approximately 30 kilometers) for target accuracy as the decimeter or centimeter level.

In contrast, the extended RTK mode (RTKX mode) refers to any mode of operation of the mobile receiver 12 after the RTK correction signal (e.g., between devices 128, 214) is lost, interrupted or corrupted at the mobile receiver 12, as indicated by a correction wireless device 214 (e.g., wireless communications device) or the navigation positioning estimator or the RTKX module. The extended RTK mode may comprise any of the following modes: converged precise positioning mode (e.g., PPP mode), relative positioning mode, and/or float ambiguity resolution in the precise positioning mode, among other possibilities.

Here, the RTK base station 430 comprises a reference receiver 30 (e.g., GNSS navigation receiver) and a wireless communications device 428, such as a wireless transceiver or transmitter. The RTK base station 430 or the reference receiver 30 determines RTK correction data, such as an offset vector (e.g., base offset vector) or difference between an observed position of the reference station based on measured carrier phase of the satellite signals and known position or coordinates of the reference receiver 30. The RTK base station 430 or the wireless communications device 428 forwards or transmits the RTK correction data to the mobile receiver 12 via the correction wireless device 214 in real time to support precise position determination and navigation at the mobile receiver.

The wireless communications device 428 (e.g., wireless communications device) may communicate directly with the correction wireless device 214, or via a wireless communications system (e.g., repeater). The correction wireless device 214 may comprise a transceiver or wireless receiver.

In one embodiment in accordance with one possible configuration, an RTK base station 430 or a local reference receiver 30 determines a precise point positioning estimate based on received satellite signals and a precise correction signal. Moreover, the RTK base station 430 or reference receiver 30 can determine the offset vector between the determined precise point positioning estimate and the known reference position (e.g., fixed coordinates of the RTK base station). The offset vector determined by a base station or reference receiver is referred to as a base offset vector or RTK offset bias. The offset vector can be transmitted from the RTK base station 430 to the mobile receiver 12 in real time via the wireless communications device 428 and the correction wireless device 214. Accordingly, in certain configurations, the mobile receiver 12 does not need to determine the offset vector because the RTK base station 430 or reference receiver 12 does.

The advantage of the above configuration is a high quality offset because of the known reference position of the reference receiver 12, but a precise correction signal (e.g., PPP correction data) is required at the reference receiver 12. In other configurations disclosed in this document, the mobile receiver 12 simultaneously determines an RTK solution and a precise position solution and computes an offset vector (e.g., mobile offset vector) between the RTK solution and the precise position solution. The offset vector determined by a mobile receiver or rover is referred to as a mobile offset vector, a rover offset vector or a learned offset vector.

Although one RTK base station 430 is shown in FIG. 2, in alternate embodiments it is possible to use multiple RTK base stations, or even a network of RTK base stations and data processing center that serves a geographic region.

Figure 3:
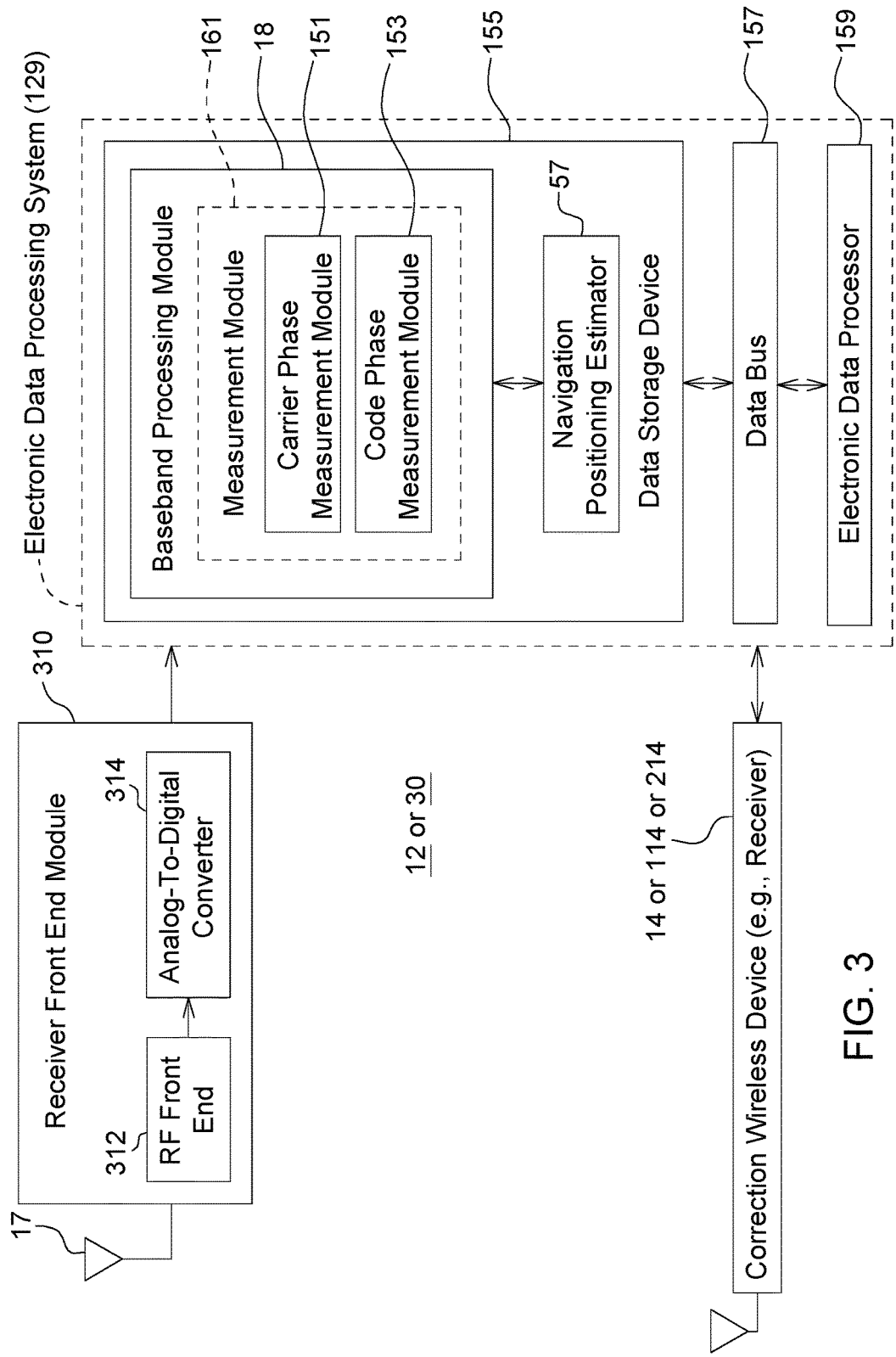
FIG. 3 is a block diagram of one embodiment of a receiver for (seamless or smooth, accurate) switching between real-time kinematic mode and precise positioning mode.

In accordance with one embodiment, FIG. 3 discloses a system or receiver (12 or 30) (e.g., satellite navigation receiver) capable of reception of received signals that comprise one or more carrier signals (e.g., a first carrier (L1), a second carrier (L2) and a third carrier (L5) of Global Positioning System (GPS)) transmitted by satellites. The received signal is transmitted from a satellite transmitter 10 of one or more satellites, such as a navigation satellite, or such as a Galileo-compatible navigation satellite, (Global Navigation Satellite System) GLONASS or Global Positioning System (GPS) satellite. The satellites have known orbital positions versus time that can be used to estimate the relative position between an antenna 17 of the receiver and each satellite based on the propagation time of one or more received signals between the three or more satellites and the antenna 17 of the receiver.

As used in this document, "CD" shall refer to code and "CR" shall refer to the carrier of the received signal or a digital representation of one or more samples of the received signal. The code comprises a modulating code (e.g., pseudo-random noise code modulated with information) that modulates the carrier.

In accordance with one embodiment FIG. 3 illustrates a receiver (12 or 30) that comprises a receiver front end module 310 coupled to an electronic data processing system 129. The receiver (12 or 30) receives a received signal that comprises one or more carrier signals from a set of satellite transmitters 10. The receiver (12 or 30) may comprise a location-determining receiver for: (a) determining a location of a receiver antenna 17, (b) a range-determining receiver for determining a range or distance between the receiver antenna 17 and a satellite (e.g., satellite antenna 17) or (c) determining ranges between the receiver antenna 17 and one or more satellites, or (d) determining position, velocity, acceleration, and/or attitude (e.g., tilt, roll, yaw) of the antenna 17.

In one embodiment, a receiver front end module 310 and the radio frequency (RF) front end 312 receive one or more received satellite signals (e.g., of one or more GNSS satellite constellations) at antenna 17. In one embodiment, the RF front end 312 comprises an amplifier, a down-conversion mixer, and a local oscillator. For example, the amplifier comprises radio frequency (RF) or microwave amplifier (e.g., low noise amplifier) that is coupled to the antenna 17 for receiving the received signal that is transmitted from one or more satellites. The amplifier provides an amplified signal to the down-conversion mixer as a first input. The local oscillator provides a signal to the down-conversion mixer as a second input. The down-conversion mixer moves or lowers the signal spectrum of the received signal from RF to an intermediate frequency (IF) or baseband frequency. The down-conversion system may include one or more mixing, amplifying, and filtering stages.

The output of the RF front end 312 is coupled to an analog-to-digital converter 314 (ADC). The ADC 314 converts the analog intermediate frequency signal or analog baseband signal to a digital signal. The digital signal comprises one or more digital samples that are available at a sampling rate. Each sample has a finite quantization level and each sample is capable of being processed by an electronic data processing system 129.

In one embodiment, the electronic data processing system 129 comprises a digital receiver portion. The electronic data processing system 129 can comprise an electronic data processor 159, a data storage device 155 (e.g., electronic memory) and a data bus 157 for communication between the electronic data processor 159 and the data storage device 155, where software instructions and data are stored in the data storage device and executed by the data processor 159 to implement any of the blocks, components or modules (e.g., electronic modules, software modules, or both) illustrated in FIG. 3.

The digital signal outputted by the ADC 314 is fed into the baseband processing module 18. In one embodiment, the baseband processing module 18 comprises a carrier wipe-off module, a local carrier signal generator, a code wipe-off module, a local code generator, correlators, and a data demodulator to process the baseband signals properly.

The data demodulator provides satellite navigation data for estimating a range (e.g., distance between a satellite and the antenna 17) or a position (e.g., in two or three dimensional coordinates) of phase center of the antenna 17. The satellite navigation data or other signal information may comprise one or more of the following information that modulates the baseband waveform of the received signal: date, satellite navigation system time, satellite status, orbital data, ephemeris data, almanac, satellite location, and satellite identifier. The data demodulator may use phase shift keying, phase demodulation, pulse width demodulation, amplitude demodulation, quadrature amplitude demodulation, or other demodulation technique that is consistent with the modulation by the modulator at the satellite transmitter.

In one embodiment, the measurement module 161 comprises a carrier phase measurement module 151 and a code phase measurement module 153. The code phase measurement module 153 measures the code phase of one or more received signals, or rather the phase of the pseudo random noise code encoded on one or more received signals. The code phase is not ambiguous in the number of cycles of at the wavelength of the code signal. The carrier phase measurement module 151 measures the carrier phase of one or more received signals. The measured carrier phase is ambiguous as to the integer number of cycles at the receiver (12 or 30).

The navigation positioning estimator 57 determines the position estimate of the receiver antenna 17 based on the measured carrier phases, estimated ranges of the measurement generation module 39 and demodulated data. For example, the navigation positioning estimator 57 or the positioning engine may use ranges from four or more satellites to determine the position, velocity, or acceleration of the antenna 17 of the receiver in two or three dimensions. In one embodiment, the navigation positioning estimator 57 estimates the propagation time between transmission of a satellite signal from a certain satellite to the receiver antenna 17 and converts the propagation time into a distance or range proportional to the speed of light. In the digital receiver portion, the receiver (12 or 30) or its data processing system 129 may comprise hardware and software instructions. For example, in one illustrative embodiment the hardware comprises a data processor 159 that communicates to a data storage device 155, which stores software instructions, via one or more data buses 157.

In the data processing system 129, the data processor 159 may comprise one or more of the following: an electronic data processor, a microprocessor, a microcontroller, an application specific integrated circuit (ASIC), digital signal processor (DSP), a programmable logic device, an arithmetic logic unit, or another electronic data processing device. The data storage device 155 may comprise electronic memory, registers, shift registers, volatile electronic memory, nonvolatile random access memory, a magnetic storage device, an optical storage device, or any other device for storing data. The data processor 159 may be coupled to the data storage device 155 via one or more data buses, which support communication between the data processor 159 and the data storage device 155.

In general, the electronic data processing system 129 comprises an electronic data processor, digital logic circuits, multiplexers, multipliers, digital filters, integrators, delay circuits, oscillator, signal generator, pseudo-noise (PN) code sequence generator, registers, shift registers, logic gates, or other hardware. The electronic data processing system 129 may support storage, retrieval and execution of software instructions stored in a data storage device.

In one embodiment, the navigation positioning estimator 57 estimates a position of the receiver antenna 17 based on the measured carrier phase and the correction data received via the correction wireless device (14, 114, 214) (e.g., satellite receiver, such as an L-band satellite receiver). In one embodiment, the navigation positioning estimator 57 comprises one or more of the following: a relative position estimator, a real-time kinematic position estimator and a precise position estimator, consistent with FIG. 4A.

Figure 4A:
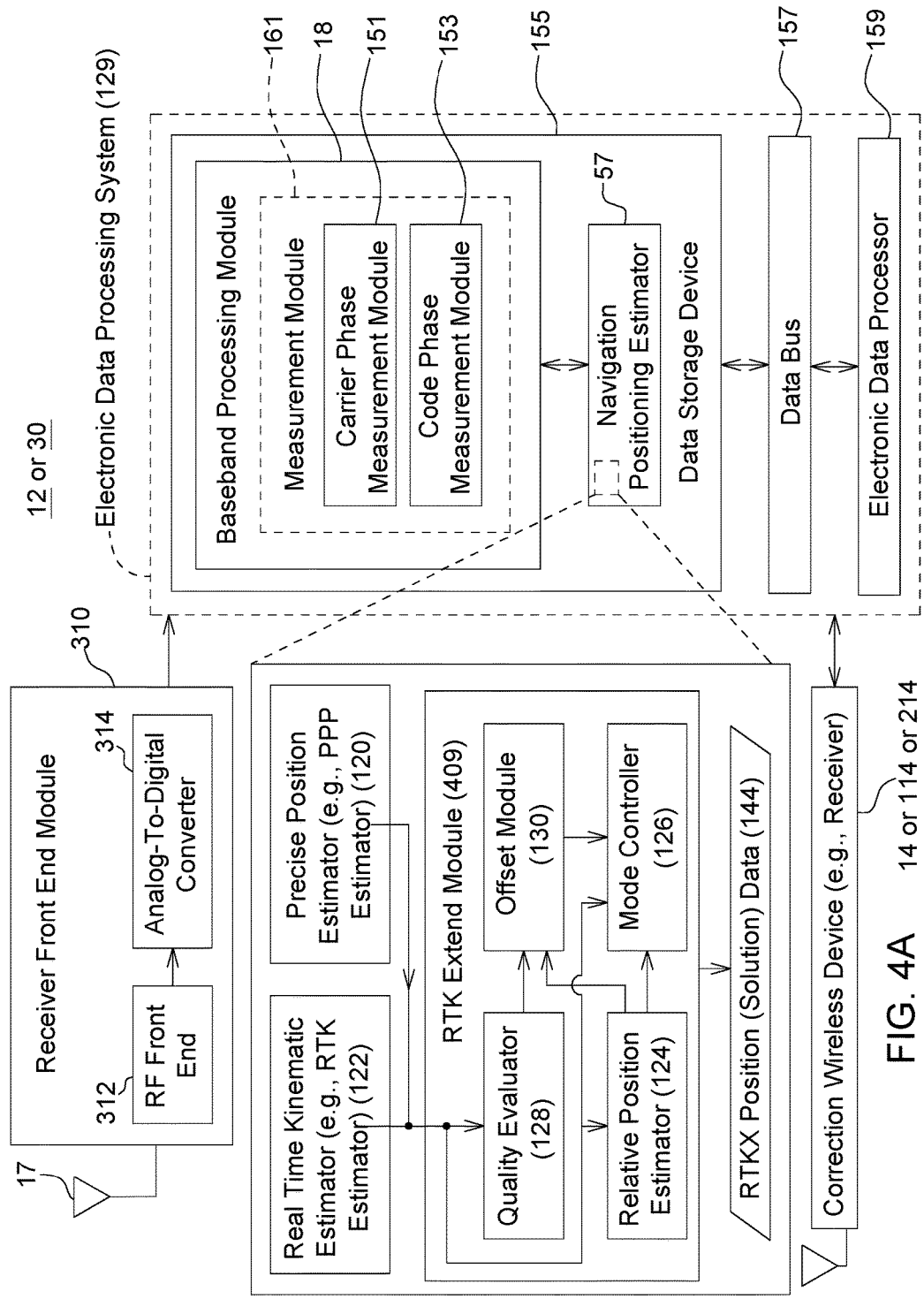
FIG. 4A is a block diagram of another embodiment of a receiver for switching between real-time kinematic mode and precise positioning mode.

FIG. 4A is a block diagram of another embodiment of a receiver for switching between real-time kinematic mode and precise positioning mode; FIG. 4A shows the navigation positioning estimator 57 in greater detail than FIG. 3. Like reference numbers in FIG. 3 and FIG. 4A indicate like elements, modules or features.

As illustrated in FIG. 4A, the navigation positioning estimator 57 comprises a real-time kinematic (RTK) estimator 122, a precise position estimator 120 (e.g., PPP estimator), and a real-time kinematic (RTK) extend module 409. The precise position estimator 120 and the RTK estimator 122 may output any of the following output data: position estimates (alone or along with corresponding variance estimates), velocity estimates, motion estimates or heading estimates. In one embodiment, the precise position estimator 120 and the RTK estimator 122 provide output data to the RTK extend module 409.

As set forth in the illustrative embodiment of FIG. 4A, the RTK extend module 409 comprises a quality evaluator 128, an offset module 130, a relative position estimator 124 and mode controller 126. The RTK extend module 409 provides reliable position data (e.g., RTK extend position data) based on the data provided by the precise position estimator 120, the RTK estimator 122, or both. In one embodiment, the mode controller 126 can select whether to output: (1) an RTK position estimate (of the RTK position estimator 122) in an RTK mode, (2) an extended RTK position estimate as a precise position estimate (e.g., with an offset vector added to it) from precise position estimator 120 in an extended RTK mode or precise position mode, or (3) or an extended RTK position estimate as a relative position from the relative position estimator 124 in an extended RTK mode or relative position mode.

In an alternate embodiment, the mode controller 126 can also determine to output a precise position estimate of the precise position estimator 120, rather than a RTK position estimate of the RTK estimator 122.

The relative position estimator 124 may estimate the position of the mobile receiver (or its antenna 17) with respect to an initial reference position (e.g., the last known RTK position), whereas the real-time kinematic position estimator 122 or the precise position estimator 120 may estimate an absolute position of the mobile receiver (or its antenna 17). In one example, the precise position estimator 120 comprises a precise point position (PPP) estimator, a wide-area global navigation satellite system (GNSS) position estimator. The real-time kinematic position estimator 122 uses RTK correction data and phase measurements to estimate the position of the mobile receiver. Similarly, the precise position estimator 120 uses precise correction data and phase measurements to estimate the position of the mobile receiver.

A real-time kinematic base station 430 (in FIG. 3) or reference receiver 30 may provide or transmit wirelessly RTK correction data to the correction wireless device 214. The correction data may comprise position data, phase data, a position offset or phase offset. In one embodiment, the real-time kinematic base station 130 comprises a reference receiver 30 that is the same or similar to the mobile receiver 12, except that the (RTK) reference receiver 30 is located at a known reference position. Accordingly, the RTK reference receiver 30 can have the same blocks and modules as the mobile receiver 12.

The data processor 159 or the navigation positioning estimator 57 may communicate data with the relative position estimator 124, the real-time kinematic estimator 122, or both. For example, the data processor 159 or navigation positioning estimator 57 may send command data to initialize or reinitialize one or more of the following: the relative position estimator 124, the real-time kinematic position estimator 120, and the precise position estimator 120.

In one embodiment, the offset module 130 determines an offset vector between the corresponding position estimates of the RTK estimator 122 in the RTK mode and the precise position estimator 120 in the precise positioning mode for the same measurement time (e.g., same epoch), where the RTK mode and the precise positioning mode are executed simultaneously by the receiver (12, 30). In another embodiment, the offset module 130 determines an offset vector based on the differential correction at an RTK base station 430 operating (at least) in the precise positioning mode, where the differential correction represents an offset vector (e.g., position vector) between an known reference position of the RTK base station 430 and an observed position of the RTK base station 430 based upon carrier phase measurements in the precise positioning mode along with precise correction data. Further, the RTK base station 430 takes the offset vector, established in the precise positioning mode, and incorporates it into RTK correction data for transmission via an RTK correction signal (e.g., electromagnetic signal) to one or more mobile receivers 12, where at that point the RTK base station 430 can be operating in the RTK to support one or more mobile receivers 12 operating in the RTK mode or the extended RTK mode. In yet another embodiment, the offset module 130 determines, obtains or retrieves an offset vector (e.g., an offset vector last stored) in an electronic data storage device 155 (e.g., nonvolatile random access memory) of the mobile receiver 12.

The quality evaluator 128 is capable of determining one or more of the following: (1) whether the RTK correction signal has been lost, interrupted or corrupted; (2) whether the RTK correction signal (or RTK data stream) has been recovered or restored, after loss, interruption or corruption; (3) whether the position or solution of the RTK estimator 122 or precise position estimator 120, or both have converged with resolved ambiguities for a particular satellite signal, or (4) availability, consistency and priority between different offset vectors in the offset module 130, such as identifying available offset vectors for each measurement time (e.g., epoch) and ranking the identified available offset vectors by priority of preferential use, predicted reliability, or priority rules. For example, the quality evaluator 128, alone or in combination with the mode controller 126, manages or executes priority rules for selection of different offset vectors, where the priority rules can be programmed into the receiver logic or data storage device 155.

In an alternate embodiment, the quality estimator 128 may determine a position quality estimate, variance, standard deviation, a statistical metric, or another quality indicator of a relative position determined by any of the following: the relative position estimator 124, the precise position estimator 120, and the RTK position estimator 122.

In one embodiment, the mode controller 126 can select whether to output an RTK position estimate (of the RTK position estimator 122), an extended RTK position estimate, a precise position estimate (of the precise position estimator 120), or relative position (of the relative position estimator 124). For example, mode controller 126 can provide an extended RTK estimate or solution from the relative position estimator 124, if the precise positioning solution (e.g., PPP solution) of the precise position estimator 120 has not yet converged with resolved ambiguities (e.g., floating or integer). The mode controller 126 is adapted to select what type of extended RTK position estimate to output and when to output that type of extended RTK position estimate. In this document, RTK extend (RTKX) position shall be synonymous with extended RTK position. In one embodiment, the mode controller 126 can also determine to output a precise position estimate of the precise position estimator 120, rather than a RTK position estimate of the RTK estimator 122. For instance, the mode controller 126 may select an RTK position estimate or an RTK extend position estimate based on the data from the quality evaluator 128.

Figure 4B:
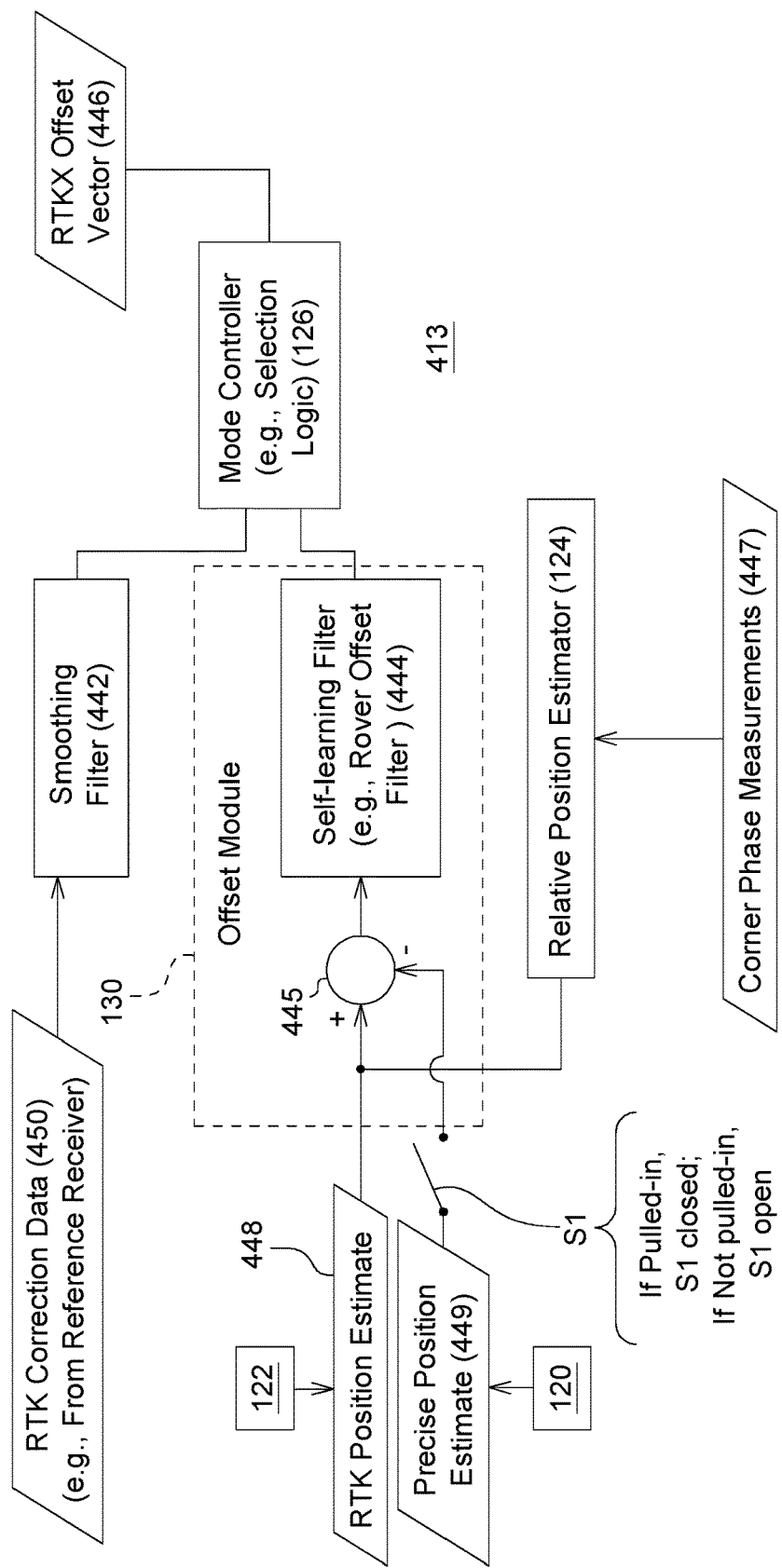
FIG. 4B is block diagram of another embodiment of the RTK extend (RTKX) module or extended RTK module.

FIG. 4B illustrates a block diagram of an alternate embodiment of an RTK extend module 413. The RTK extend module 413 of FIG. 4B is similar to the RTK module 409 of FIG. 4A, except the RTK extend module 413 further comprises a smoothing filter 442, a self-learning filter 444 (e.g., offset rover filter), and a summer 445. Like reference numbers in FIG. 4A and FIG. 4B indicate like elements or features.

From the correction wireless device (14, 114, or 214), the RTK correction data 450 is inputted to the smoothing filter 442 of the mobile receiver 12. The smoothing filter 442 smooths or filters the RTK correction data. For example, in one configuration the smoothing filter 442 smooths the RTK correction data or offset vector (e.g., base offset vector from the reference station) therein in accordance with the process, method or steps of FIG. 7. Smoothing of the base offset vector by the filter 442 yields a reliable smoothed base offset vector after an initialization time period. In one embodiment, an output or smoothed base offset vector of the smoothing filter 442 is not deemed ready for use (or sufficiently reliable) until the smoothing filter 442 has smoothed RTK correction data 450 over an initialization time period or threshold duration after starting the filter for a set of satellites. The initialization time period or threshold duration may be measured in terms of epochs of the observed carrier phase of the received signals from one or more satellites. The output of the smoothing filter is provided to the mode controller 126.

The RTK estimator 122 provides a set of RTK position estimates 448 for one or more corresponding measurement times (e.g., epochs) to the offset module 130 or RTK extend module (409 or 413). After or once the precise position estimator 120 (of the mobile receiver 12) converges or pulls-in the carrier phase with ambiguity resolution for a set of satellites (e.g., schematically represented where 51 has a closed state in FIG. 4B), the precise position estimator 120 provides a set of precise position estimates or solutions for one or more corresponding measurement times (e.g., epoch) to the offset module 130. As illustrated, the offset module 130 comprises a summer 445 that determines an offset vector (e.g., mobile offset vector), error or difference between the RTK position estimate 448 and the precise point position estimate 449 for corresponding measurement times (e.g., epochs). The offset vector (e.g., mobile offset vector) is provided to the self-learning filter 444 or rover offset filter, such as Kalman filter, for refinement, such as error reduction or minimization.

Although switch 51 is illustrated separately, in practice the switch 51 may represent a software switch, a hardware switch, logic or software instructions in the offset module 130 or in the self-learning filter 444. Accordingly, in alternate embodiments switch 51 may not be shown separately or may be deleted from a block diagram such as FIG. 4B.

Prior to pull-in or convergence of the phase ambiguities (e.g., schematically represented where 51 has an open state in FIG. 4B) underlying the precise position estimate 449, the relative position estimator 124 provides a relative position estimate to the offset module 130 or the summer 445 for determination of the relative offset vector, error or difference between a last available RTK position estimate (e.g., prior to RTK signal loss, interruption or corruption) and a current position of the mobile receiver 12. The relative offset vector can be used for a maximum time period, or configured for chained relative offset vectors for an extended indefinite time period.

The mode controller 126 may comprise selection logic that determines whether to select one or more of the following for RTKX offset vector 446 based on selection logic or priority rules: (1) smoothed base offset vector from an output of the smoothing filter 442, which is based on a base offset vector within the RTK correction data, (2) learned or mobile offset vector from the offset module 130 or self-learning filter 444, which is based on a difference between the RTK position estimate and the precise position estimate for the same epoch, (3) relative position estimate of the relative position estimator 124, which uses a last available RTK measurement of the mobile receiver 12 prior to signal loss, interruption or corruption, and (4) a saved offset vector that is any of the foregoing offset vectors that is saved in the data storage device 155 of the mobile receiver. For example, the mode controller 126 selects the filtered offset from the self-learning filter or the smoothed RTK correction data from the soothing filter as the RTKX offset vector. The navigation positioning estimator 57 can use the selected RTKX offset vector to determine the precise position of the mobile receiver 12 or rover for an indefinite time period after loss or outage of the RTK correction signal.

Figure 5:
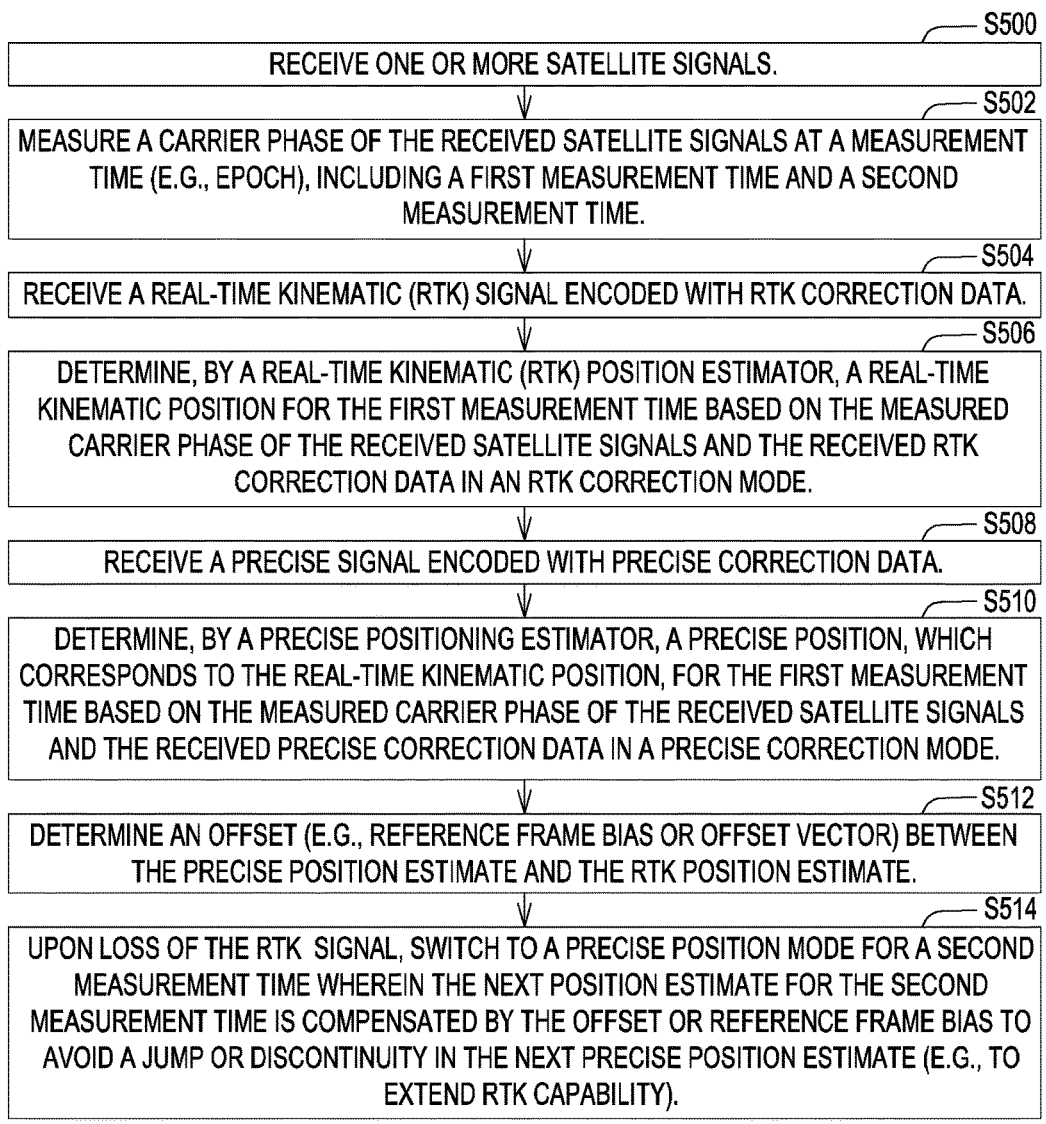
FIG. 5 is a flow chart of a first embodiment of a method for operating a satellite receiver for (seamless or smooth, accurate) switching between real-time kinematic mode and precise positioning mode.

FIG. 5 is a flow chart of a first embodiment of a method operating a satellite navigation receiver, and more particularly for switching between a real-time kinematic mode and a precise positioning mode. Extended RTK (RTKX) mode means an operational mode of the receiver 12 after RTK correction signal is lost, interrupted, corrupt or unavailable. The method of FIG. 5 begins in step S500.

In step S500, a mobile receiver 12 or rover receives one or more satellite signals (e.g., L1 frequency satellite signals and L2 frequency satellite signals) from a set of satellites (e.g., GNSS satellites). For example, the mobile receiver 12 receives satellite signals from a set of at least four satellites of a GNSS system, such as Global Positioning System, or GLONASS, or both, to estimate a position of the mobile receiver 12 in three dimensional coordinates.

In step S502, a mobile receiver 12 or a carrier phase measurement module 151 measures a carrier phase of the received satellite signals at a measurement time (e.g., epoch), including a first measurement time and a second measurement time.

In step S504, a mobile receiver 12 or correction wireless device (14, 114 or 214) receives a real-time kinematic (RTK) signal encoded with RTK correction data. For example, the correction wireless device (14, 114, or 214) comprises a correction wireless receiver or transceiver for receiving an RTK correction signal, which is encoded with RTK correction data, from an RTK base station 430 or an RTK network of base stations. In one embodiment, the RTK correction data is locally valid where there is certain maximum baseline (e.g., approximately twenty to thirty kilometers) or separation between the mobile receiver 12 and the reference receiver 30 (or RTK reference base station 430).

In step S506, the navigation positioning estimator 57 or the real-time kinematic estimator 122 determines a real-time kinematic position for the first measurement time based on the measured carrier phase of the received satellite signals and the received RTK correction data in an RTK correction mode.

In step S508, the mobile receiver 12 or the correction wireless device (14, 114, or 214) receives a precise signal encoded with precise correction data. The precise correction data may be universally or globally valid, rather than limited to local geographic area like the RTK correction data. Further, the precise correction data comprises precise clock corrections and orbit corrections. In one example, the correction wireless device (14 of FIG. 1A) may comprise a correction wireless satellite receiver for receiving a precise correction signal, which is encoded with precise correction data, such as precise clock corrections and precise orbit corrections from a correction data estimator of a data processing center. In another example, the correction wireless device (114 or FIG. 1B) comprises a correction wireless transceiver that communications with a wireless communications system for providing a precise correction signal from the correction data estimator 34 of a data processing center 18.

In step S510, the navigation positioning estimator 57 or the precise positioning estimator 120 determines a precise position which corresponds to the real-time kinematic position for the first measurement time based on the measured carrier phase of the received satellite signals and the received precise correction data in a precise correction mode. In one embodiment, the precise position is based on a resolved or fixed integer ambiguity for the carrier phase of the satellite signals. In an alternate embodiment, the precise position is based on a floating ambiguity for the carrier phase of one or more satellite signals.

In step S512, the navigation positioning estimator 57 or the offset module 130 determines an offset (e.g., reference frame bias or offset vector) between the precise position estimate and the RTK position estimate (e.g., for the same measurement time or epoch). The precise position estimate and the RTK position estimate do not use the same datum or identical data (e.g., different Kalman filter states may apply to the estimators (120, 122)) to generate or estimate the position of the mobile station. For example, the precise position estimate of the precise position estimator 120 and the RTK position estimate of the RTK estimator 122 may not use the same coordinate reference frame. Accordingly, when using the precise position solution in an extended RTK solution (e.g., RTKX solution) a bias or offset vector must be added to account for the difference of local RTK solution and precise position (e.g., global PPP solution).

Because RTK generates a position relative to the known coordinates of the reference receiver or base station, any discrepancy between the stored known coordinates (e.g., base station reference location of reference receiver 30) and its actual position in both global International Terrestrial Reference Frame (ITRF) and epoch time (e.g., measurement time of carrier phase measurements or other observables) will result in discrepancy between the RTK position solution and precise position solution. This discrepancy is called the offset vector, or RTKX offset vector. If the offset vector is not accounted for when outputting the precise position solution (e.g., in the extended RTK mode that uses precise position estimate of precise position estimator 120 of the mobile receiver 12), an unwanted shift in the mobile position of the mobile receiver 12 can occur in the transition between the RTK position estimate and the precise position estimate. The offset vector can be as large as 50 meters depending on the accuracy of the base reference coordinates and arbitrary coordinates at base station. Mathematically, the RTKX solution can be written as:

$$X_{RTKX} = X_p b$$

where $X_{RTKX}$ is the RTK position estimate of the reference station or reference receiver, $X_p$ is the precise position estimate (e.g., PPP estimate) for the reference station or reference receiver for the same measurement time or epoch as the RTK position estimate, and b is the RTKX offset vector (e.g., base offset vector) for the measurement time or epoch.

$X_{RTKX}$ differs from the stored known coordinates for the reference station 430 or reference receiver 30 and incorporates any error between the stored known coordinates and actual coordinates.

There are several sources for offset vector or RTKX offset vector, which may be used separately or cumulatively: (1) reference receiver 30, (2) mobile receiver 12, or (3) data storage device of reference receiver 30 or mobile receiver 12.

Reference Receiver as Source for Offset Vector:

First, the offset vector may be provided from the reference receiver 30 or base station 430 in an RTK data message, such as an RTK data correction message in a first RTK data message format or a second RTK data message format, where the first RTK date format may comprise available RTK correction data message is derived from precise mode operation (e.g., PPP mode) of the precise position estimator 120 and wherein the second RTK data message is derived from RTG mode operation of the precise position estimator 120. If the offset vector (e.g., base offset vector) is determined at the reference receiver 30 or base station 430, the offset vector is communicated to the mobile receiver 12 via a wireless communications channel, such as satellite communications channel or wireless channel on a cellular communications network. For example, the base reference receiver 30 generates the RTK correction data or RTK correction message by calculating the difference between the reference station coordinates used for the (RTK) reference receiver 30 and its position as calculated by the RTK estimator 122, its Kalman filter, or the precise position estimator 120, or its Kalman filter. The instantaneous delta between these two positions is sent to the mobile receiver 12 in the RTK correction messages. At the mobile receiver 12, the RTKX module (409, 413), the offset module 130, or the smoothing filter 442 reads in the RTK correction message and filters the noise in the data to obtain a smooth and accurate estimate of the offset vector (e.g., reliable smoothed base offset vector).

Mobile Receiver as Source for Offset Vector:

Second, the offset vector (e.g., mobile offset vector) may be determined or self-learned by the offset module 130 or the self-learning filter 444 at the mobile receiver 12 from difference between RTK solution and precise position solution after the precise position solution has converged to resolve the ambiguities in the carrier phase. In a similar way to the determination of the offset vector at the reference station 430 or reference receiver 30, the offset vector or RTKX offset vector could also be learned or determined in the rover when RTK is available and when the precise position is already pulled-in or converged based on integer ambiguity resolution of the carrier phase measurements. When the precise position solution is already pulled-in in the rover 12, the offset vector, $b_{rov}$, can be calculated in the following manner:

$$b_{rov} = X_{RTK} - X_P$$

Where $X_{RTK}$ is the position estimate of the mobile receiver 12 determined by the RTK estimator 122 for a measurement time (e.g., epoch), where $X_p$ is the converged precise position estimate (e.g., PPP estimate) of the precise positioning estimator 120 for the measurement time, and $b_{rov}$ is the offset for the measurement time.

Data Storage Device as Source for Offset Vector:

Third, the offset vector may be retrieved from a data storage device 155 in the receiver (12, 30), such as non-volatile random access memory.

In an alternate embodiment of S512, the navigation positioning estimator 57 or the offset module 130 determines an offset (e.g., reference frame bias or offset vector) between the precise position estimate and the known reference position (e.g., reference coordinates) of the reference station 30 for transmission to the mobile receiver 12 a base offset vector. Accordingly, the offset vector comprises a differential position vector between an observed position of a reference receiver and a known position of the reference receiver to avoid a jump or discontinuity in the next extended RTK position estimate.

In step S514, upon loss, interruption or corruption of the RTK signal, the navigation positioning estimator 57 or the mode controller 126 switches to a precise position mode (or an extended RTK position mode) for a second measurement time if the precise position mode is ready or available; wherein the next precise position estimate (or extended RTK position estimate) for the second measurement time is compensated by the offset vector or reference frame bias to avoid a jump or discontinuity in the next precise position estimate (e.g., to extend RTK capability). However, if the precise position mode is not available, reliable or ready, the a relative position mode may be used as the extended RTK position mode. The second measurement time follows the first measurement time, where the second measurement time may comprise the next measurement time for collecting a carrier phase measurement after the loss, interruption or corruption of the RTK signal at the mobile receiver 12. Because the navigation positioning estimator 57 or precise position estimator 120 can determine the precise position solution repeatedly, there is no limitation on how long the loss, interruption or corruption of the RTK signal can last, while still providing accurate offset and position estimates.

Step S514 may be executed in accordance with various techniques, which may be applied alternately or cumulatively.

Under a first technique, upon the loss, interruption or corruption of the RTK signal, while reaching of an end of an initialization time period of a smoothing filter 442 for a base offset vector received from a base station 130 and while having attained convergence by the mobile receiver 12 on the precise position in conjunction with ambiguity resolution of the measured carrier phase associated with the precise position, the mode controller 126 or data processor 159 switches to a precise position mode, wherein the next precise position estimate is compensated by the smoothed base offset vector to avoid a jump or discontinuity in the next precise position estimate.

Under a second technique, upon the loss, interruption or corruption of the RTK signal, the mode controller 126, data processor 159 or navigation positioning estimator 57 can:

(1) switch to a precise position mode with a live base offset vector provided by a reference receiver as a first priority if the precise position of the reference receiver has converged and if a live base offset vector is smoothed after an initialization period;

(2) switch to a precise position mode with a live mobile offset vector provided by the mobile receiver 12 as a second priority if the precise position of the mobile receiver 12 has converged;

(3) switch to a precise position mode with a live base offset vector or a live mobile offset vector as a third priority if the precise position of the mobile receiver 12 has determined a float solution for the ambiguities associated with the precise position;

(4) switch to a precise position mode with a stored offset vector in a data storage device of the mobile receiver 12 as a fourth priority, wherein the live offset vectors are not available, if the stored offset vector is sufficiently current in view of time period between a measurement time and the current time.

Under a third technique, upon the loss, interruption or corruption of the RTK signal, the data processor 159, navigation positioning estimator 57, or offset module 130 can:

(1) switch to a precise position mode with a live base offset vector provided by a reference receiver as a first priority if the precise position of the reference receiver has converged;

(2) switch to a precise position mode with a live mobile offset vector provided by the mobile receiver 12 as a second priority if the precise position of the mobile receiver 12 has converged;

(3) switch to a relative position mode as a third priority if the precise position of the mobile receiver 12 has not converged consistent with the first priority or the second priority.

Under a fourth technique, upon loss, interruption or corruption of the RTK signal, while not reaching an end of an initialization time period of a smoothing filter 442 with a reliable smoothed base offset vector and while having attained convergence of ambiguity resolution of the measured carrier phase associated with the precise position at the mobile receiver 12, the mobile receiver 12 switches to a precise position mode, wherein the next precise position estimate is compensated by the rover offset vector to avoid a jump or discontinuity in the next precise position estimate.

Under a fifth technique, upon loss, interruption or corruption of the RTK signal, while not having a reliable smoothed base offset vector, or not reaching an end of the initialization time period, and while not converging on the precise position at the mobile receiver 12, the mobile receiver 12, mode controller 126 or relative position estimator 124 switches to a relative position mode. The next precise position estimate is based on a last available RTK position prior to the loss and a relative position vector between a last available measurement time and a next measurement time.

Under a sixth technique, upon loss, interruption, or corruption of the RTK signal, while not reaching the end of the initialization time period or while reaching the end of the initialization time period without a reliable base offset vector and while not converging on resolved phase ambiguities underlying the precise position for the base offset vector, the mode controller 126, data processor 159 or navigation positioning estimator 57 switches to a the precise position mode, wherein the next precise position estimate is compensated by the rover offset vector to avoid a jump or discontinuity in the next precise position estimate.

Under a seventh technique, upon loss, interruption or corruption of the RTK signal, while not reaching the end of the initialization time period without a reliable base offset vector or while converging on phase ambiguities underlying the precise position for the base offset vector, the mode controller 126, data processor 159 or navigation positioning estimator 57 switches to a the precise position mode, wherein the next precise position estimate is compensated by the stored offset vector in a data storage device of the mobile receiver from a prior convergence of the precise position at the reference receiver or the mobile receiver to avoid a jump or discontinuity in the next precise position estimate.

Under an eighth technique, upon loss or interruption of the RTK signal, while reaching of the end of the initialization time period with a reliable smoothed base offset vector and while having attained convergence on the precise position in conjunction with ambiguity resolution of the measured carrier phase associated with the precise position, the mode controller 126, data processor 159 or navigation positioning estimator 57 switches to a precise position mode, wherein the next precise position estimate is compensated by the smoothed base offset vector and wherein the smoothed base offset vector applies to a reference receiver and a mobile receiver of the same manufacturer that does not require an additional receiver bias to avoid a jump or discontinuity in the next precise position estimate.

Under a ninth technique, upon loss, corruption or interruption of the RTK signal and the precise position mode is not yet available for use (e.g., if the precision position mode is not converged on a position solution), the receiver switches to a relative positioning mode that uses the last known RTK position solution and carrier phase measurements to navigate until the precision position solution is available for use.

Figure 6:
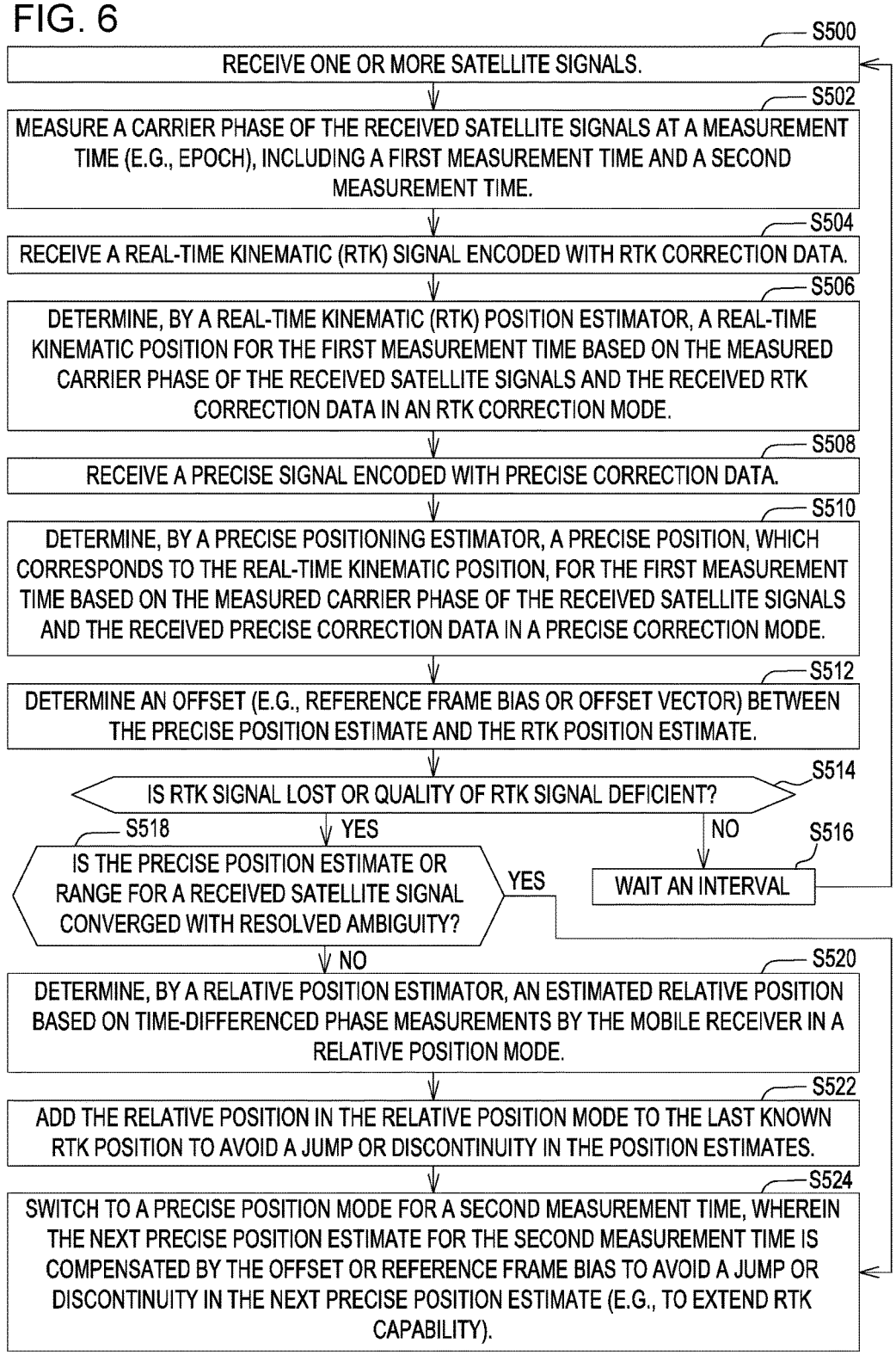
FIG. 6 is a flow chart of a second embodiment of a method for operating a satellite receiver for (seamless or smooth, accurate) switching between real-time kinematic mode and precise positioning mode.

FIG. 6 is a flow chart of a first embodiment of a method operating a satellite navigation receiver, and more particularly for switching between a real-time kinematic mode and a precise positioning mode. Like reference numbers in FIG. 5 and FIG. 6 indicate like procedures or steps. The method of FIG. 6 begins in step S500.

In step S500, a mobile receiver 12 or rover receives one or more satellite signals (e.g., L1 frequency satellite signals and L2 frequency satellite signals) from a set of satellites (e.g., GNSS satellites). For example, the mobile receiver 12 receives satellite signals from a set of at least four satellites of a GNSS system, such as Global Positioning System, or GLONASS, or both, to estimate a position of the mobile receiver 12 in three dimensional coordinates.

In step S502, a mobile receiver 12 or a carrier phase measurement module 151 measures a carrier phase of the received satellite signals at a measurement time (e.g., epoch), including a first measurement time and a second measurement time.

In step S504, a mobile receiver 12 or correction wireless device (14, 114 or 214) receives a real-time kinematic (RTK) signal encoded with RTK correction data. For example, the correction wireless device (14, 114, or 214) comprises a correction wireless receiver or transceiver for receiving an RTK correction signal, which is encoded with RTK correction data, from an RTK base station 430 or an RTK network of base stations. In one embodiment, the RTK correction data is locally valid where there is certain maximum baseline (e.g., approximately twenty to thirty kilometers) or separation between the mobile receiver 12 and the reference receiver 30 (or RTK reference base station 430).

In step S506, the navigation positioning estimator 57 or the real-time kinematic estimator 122 determines a real-time kinematic position for the first measurement time based on the measured carrier phase of the received satellite signals and the received RTK correction data in an RTK correction mode.

In step S508, the mobile receiver 12 or the correction wireless device (14, 114, or 214) receives a precise signal encoded with precise correction data. The precise correction data may be universally or globally valid, rather than limited to local geographic area like the RTK correction data.

Further, the precise correction data comprises precise clock corrections and orbit corrections. In one example, the correction wireless device (14 of FIG. 1A) may comprise a correction wireless satellite receiver for receiving a precise correction signal, which is encoded with precise correction data, such as precise clock corrections and precise orbit corrections from a correction data estimator of a data processing center. In another example, the correction wireless device (114 or FIG. 1B) comprises a correction wireless transceiver that communications with a wireless communications system for providing a precise correction signal from the correction data estimator 34 of a data processing center 18.

In step S510, the navigation positioning estimator 57 or the precise positioning estimator 120 determines a precise position which corresponds to the real-time kinematic position for the first measurement time based on the measured carrier phase of the received satellite signals and the received precise correction data in a precise correction mode. In one embodiment, the precise position is based on a resolved or fixed integer ambiguity for the carrier phase of the satellite signals. In an alternate embodiment, the precise position is based on a floating ambiguity for the carrier phase of one or more satellite signals.

In step S512, the navigation positioning estimator 57 or the offset module 130 determines an offset (e.g., reference frame bias or offset vector) between the precise position estimate and the RTK position estimate (e.g., for the same measurement time or epoch). Further details of step S512 are set forth in the description of FIG. 5.

In step S514, the navigation position estimator or the quality evaluator 128 determines whether the RTK signal is lost, interrupted, corrupted, or whether the quality of the RTK signal, RTK correction data, or base offset vector is deficient. If the navigation position estimator or the quality estimator determines that the RTK signal is lost, interrupted, or corrupted or that the quality of the RTK signal is deficient, the method continues with step S518. However, if the RTK signal is not lost, interrupted, corrupted and if the quality of the RTK signal or RTK correction data is not deficient (e.g., the quality of RTK signal is adequate), then the method continues with step S516.

In step S516, the data processor 159 or navigation positioning estimator 57 waits an interval prior to returning to step S500 for another iteration of certain steps of the method.

In step S518, the navigation position estimator 57 or the precise position estimator 120 determines whether the precise position estimate or range for a set of received satellite signals has converged with or pulled-in a set of resolved ambiguities or floating ambiguities. Converged or pulled-in means that the observed phase measurements and associated phase ambiguities of the received satellite signals have reached a steady state of accuracy that approaches maximum precision for the corresponding position estimate or solution, or that the navigation positioning estimator 57 has resolved integer ambiguities for a set of satellite receivers for a current measurement time (e.g., epoch). If not pulled in, there will be a position jump when the solution transitions from RTK mode to extended RTK mode (e.g., RTKX). If the navigation position estimator 57 or the precise position estimator 120 has not converged with a resolved ambiguity for a particular satellite, the method continues with step S520 for the satellite with the unresolved ambiguity. However, if the navigation position estimator 57 or the precise position estimator 120 has converged with a resolved ambiguity for a particular satellite, the method continues with step S524.

In an alternate embodiment in step S518, the navigation position estimator 57 or RTKX module (409, 413) determines: (1) whether the precise position estimate or range for a received satellite signal has converged or pulled in with a resolved ambiguity and (2) whether the offset vector (e.g., base offset vector or smoothed base offset vector) or RTKX offset vector is ready. In one embodiment, the navigation positioning estimator requires the smoothing filter 442 or offset module 130 to run for at least an initialization time period (e.g., at least five (5) minutes) after initialization of a reference receiver 30 (or starting of its smoothing filter 442) or switching between reference receivers 30 before declaring the offset vector to be ready. If the navigation position estimator 57 or the RTKX module (409, 413) determines that (1) the precise position estimate or range for a received satellite signal has converged or pulled in with a resolved ambiguity and (2) the offset vector or RTKX offset vector is ready, the method continues with step S524. However, if the navigation position estimator or the precise position estimator 120 has not converged with a resolved ambiguity for a particular satellite, the method continues with step S520. In one configuration, failing to meet either or both of the above two conditions can prevent an RTKX solution (as opposed to a relative position solution) from being outputted from the engine or RTKX module.

In step S520, the navigation position estimator 57 or the relative position estimator 124 determines an estimated relative position based on time-differenced phase measurements by the mobile receiver in a relative position mode.

In step S522, the navigation position estimator 57 or RTK extend module (409, 413) adds the relative position vector in the relative position mode to the last known RTK position to avoid a jump or discontinuity in the position estimates. To increase the availability of RTKX especially during frequent RTK outages, the RTKX module (409, 413) uses a relative position estimator 124 or engine when the precise position solution or the offset vector is not ready yet. In one embodiment, the relative position estimator 124 uses the precise correction data to generate changes in position relative to a certain epoch. The relative position is a delta position from a reference position at its initialization time. When used in the context of RTKX, the relative position estimator 124 is initialized with the last known RTK position of the mobile receiver prior to loss, interruption or corruption of the RTK signal correction at the last epoch; the RTKX module (409, 413) or relative position estimator 124 estimates the delta positions from that last epoch to provide an RTKX position.

Further, the relative position estimator 124 or engine can estimate an offset vector based on the RTK position used to initialize the engine. In certain embodiments, the relative offset vector is not typically as accurate as the other sources of offset vector but will increase the availability of RTKX to users. The RTKX solution based on relative position can be used until the precise position estimate is pulled-in by the precise position estimator 120 and an offset vector (e.g., base offset vector or mobile offset vector) is ready. In one embodiment, if there is no offset vector provided from a base station, reference receiver (e.g., self-learned rover bias), or mobile receiver operating in the RTK mode and the precise position mode simultaneously, the relative position estimator 124 can provide the RTKX estimate for a maximum time period (e.g., up to an hour) prior to providing an alert or data message to the end user about degraded accuracy.

In step S524, the navigation position estimator or the mode controller 126 switches to a precise position mode for a second measurement time, wherein the next precise position estimate for the second measurement time is compensated by the offset (e.g., of step S512) or reference frame bias to avoid a jump or discontinuity in the next position estimate (e.g., to the extend RTK capability). The second measurement time follows the first measurement time, where the second measurement time may comprise the next measurement time for collecting a carrier phase measurement after the loss, interruption or corruption of the RTK signal at the mobile receiver 12.

Figure 7:
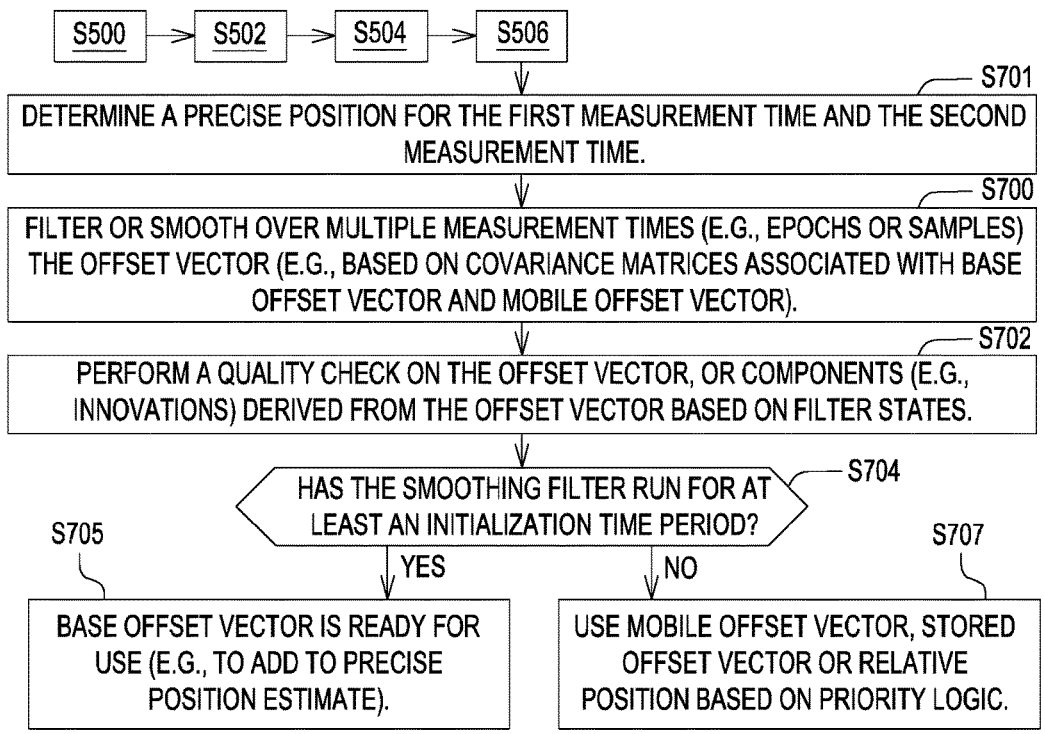
FIG. 7 is a flow chart of a third embodiment of a method for operating a satellite receiver for switching between real-time kinematic mode and precise positioning mode, or associated method for quality check for smoothing filter and readiness of base offset vector from reference receiver.

The method of FIG. 7 is similar to certain steps in the method of FIG. 5. Further, FIG. 7 adds several steps related to smoothing, among other things. Like reference numbers in FIG. 5 and FIG. 7 indicate like procedures or steps. The method of FIG. 7 begins in step S500.

Steps S500, S502, S504 and S506 are described in conjunction with FIG. 5 and which applies equally to FIG. 7 as if set forth here. After step S506, the method of FIG. 7 may continue with step S701.

In step S701, the navigation positioning estimator 57 or the precise positioning estimator 120 determines a precise position for the first measurement time, the second measurement time, or both based on the measured carrier phase of the received satellite signals and the received precise correction data in a precise correction mode. In one embodiment, the precise position is based on a resolved or fixed integer ambiguity for the carrier phase of the satellite signals. In an alternate embodiment, the precise position is based on a floating ambiguity for the carrier phase of one or more satellite signals In step S700, the smoothing filter 442 or offset module 130 filters or smooths over multiple measurement times (e.g., epochs or samples) the offset vector (e.g., base offset vector). For example, the smoothing filter 442 filters or smooths the base offset vector based on covariance matrices associated with the base offset vector and the mobile offset vector. To improve accurate RTKX solution, a smoothing filter 442, such as Kalman filter can be used to estimate the offset vector (e.g., RTKX offset vector). In one embodiment, the offset vector may be presented or organized in a first RTK data message format (e.g. derived from RTG mode) from an RTK base station 430 or reference receiver 30, in a second RTK data message format (e.g., derived from PPP mode) from an RTK base station 430 or reference receiver 30, or as self-learned b$_{rov}$ by the mobile receiver 12 or rover.

In one configuration, the state vector x is the smoothed offset vector in the NEU frame. NEU means North-East-Up reference as opposed to the XYZ (ECEF, Earth-Centered Earth-Fixed) frame. NEU allows us to express the vector in the horizontal (North-East plane) and the vertical planes. The NEU frame is chosen because the behavior of the precise position solution is well characterized in the horizontal and vertical plane and, thus, simplifies the tuning process of the filter 442.

For example, in step S700, the smoothing filter 442 filters or smooths the offset vector in accordance with the following equation:

$$\hat{x}_{k+1} = (I-K)\hat{x}_x + Ky$$

where I is an identity matrix, $y_k$ is the instantaneous offset vector from the base station 430 (or reference receiver 30) at time k transformed into the NEU frame and K is the Kalman gain calculated using the following equation:

$$K = (P_k + Q)(R + P_k + Q)^{-1}$$

The posterior covariance matrix, $P_k$, is calculated using the following equation:

$$P_{k+1} = (I-K)(P_k + Q)(I-K)^T + KRK^T$$

where, Q is a diagonal process noise matrix which elements are used to tune the smoothing filter 442 430, where R is the measurement covariance matrix. The process noise matrix is associated with the GNSS system measured, which may have random or white noise characteristics that may be modeled as a Gaussian distribution or otherwise.

For the base offset vector obtained from the base station 430 or reference receiver 30, R is populated using the figure of merit (FOM) of the solution transmitted from the RTK base station 430 or reference receiver 30. A simplified matrix is assumed to be diagonal and the vertical standard deviation is assumed to be twice the value of its horizontal 1-D counterpart. In other words, $$R = \begin{bmatrix} \left(0.5 \times \frac{FOM}{100}\right)^2 & 0 & 0 \\ 0 & \left(0.5 \times \frac{FOM}{100}\right)^2 & 0 \\ 0 & 0 & \left\{2\left(0.5 \times \frac{FOM}{100}\right)\right\}^2 \end{bmatrix}$$

For the self-learned offset vector (e.g., RTKX offset vector) from the offset module 130 at the rover 12, the R matrix is populated using the full position covariance matrix from the precise position estimator 120 and the RTK estimator 122. Mathematically, $$R = P_{XRTK} P_{XP}$$

In step S702, the smoothing filter 442 or offset module 130 performs a quality check on the offset vector, or components (e.g., innovations) derived from the offset vector based on filter states. For example, because the precise position solution is known to have occasional small jumps in the solution due to ambiguity shuffling (e.g., from ambiguity refinement, ambiguity convergence, or setting satellites associated with loss of different satellite signals), an innovation check is performed in the Kalman filter, the RTKX module, or the navigation positioning estimator to further enhance the smoothness of the offset vector. Innovation measures the prediction error in the output of the smoothing filter 442 or Kalman filter. The innovation A is defined as follows:

$$\Delta = \begin{bmatrix} \Delta_N \\ \Delta_E \\ \Delta_U \end{bmatrix} = x - y$$

where $A_N$ is the horizontal north plane innovation, $\Delta_E$ is the horizontal east plane innovation, $\Delta_u$ is the vertical innovation, x is an estimate of the state (e.g., first state) of the offset vector, and y is a measurement (e.g., second state) of offset vector after the estimate x.

The 2-D horizontal innovation is defined as:

$$\Delta_{NE} = \sqrt{\Delta_N^2 + \Delta_E^2}$$

In one example of carrying out step S702, the following innovation check algorithm is implemented.

1) If $\|\Delta\| > 1.5$ meters or another maximum threshold displacement, the measurement y is rejected. Rejecting y for more than a maximum count (e.g., 60 times) will reset the offset source smoothing filter 442.

2) The process noise matrix Q is inflated if the 2-D horizontal innovation, $\Delta_{NE}$, is greater than the one-sigma horizontal covariance or if the vertical innovation, $\Delta_U$, is greater than the one-sigma vertical covariance.

One sigma refers to one standard deviation of random variable, such as an innovation component, from an expected value or mean of a statistical population.

Step S704 may be executed before, during or after step S702. In step S704, the data processor 159 or RTK extend module (409, 413) determines whether the smoothing filter 442 has run or been active for at least an initialization time period (e.g., approximately five minutes). If the data processor 159 or the RTK extend module (409, 413) determines that the smoothing filter 442 has run or been active for at least an initialization period, then the method continues with step S705. However, if the data processor 159 or the RTK extend module (409, 413) determines that the smoothing filter 442 has not run or been active for at least the initialization period, the method continues with step S707.

In one embodiment, the smoothing filter 442 has to run for at an initialization time period (e.g., at least 5 minutes) before declaring the base offset vector to be ready as a reliable offset vector for RTKX use or use in the precise positioning mode. All of the smoothing filters (e.g., 442) are reset when base station 430 changes for a mobile receiver 12, such that the smoothing filter 442 needs to be reinitialized before the base offset vector is available. For instance, if the mobile 12 receiver moves the new closest base station or most reliable base station may be used to provide the RTK correction data over a wireless communications channel, which requires initialization of the new closest base station 430.

In step S705, the base offset vector is ready for use or used. For example, the navigation positioning estimator 57 or the precise position estimator 120 can add the base offset vector to a precise position estimate to avoid a jump or discontinuity upon a transition from RTK mode to extended RTK mode or precise position mode.

In step S707, the navigation positioning estimator 57 or data processor 159 can use or flag as available one or more of the following: a mobile offset vector, a stored offset vector, or relative position based on priority rules or logic in the data storage device 155. However, the navigation position estimator 57 cannot use or make available the base offset vector until the initialization time period has lapsed. For example, the priority logic or priority rules may be based on if-then statements, or a list or hierarchy of preferred offset vectors, their substitutes or proxies including the following: (1) if the smoothing filter has run for an initialization period and/or passed a quality check, then use the base offset vector of the reference receiver; (2) if the smoothing filter has not run for at least an initialization time period, then use one of the following in the following order of preference: (a) mobile offset vector determined by the mobile receiver, (b) stored offset vector from a data storage device in the mobile receiver, and (c) relative position determined by the relative position estimator.

Figure 8:
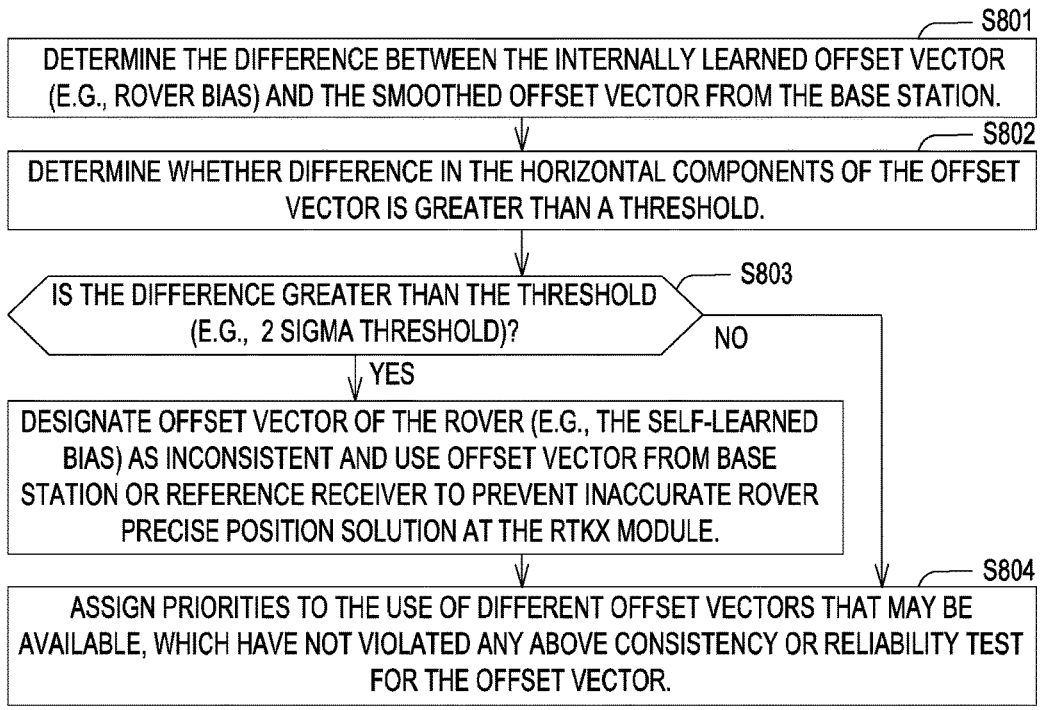
FIG. 8 is a flow chart of a fourth embodiment of a method for operating a satellite receiver for (seamless or smooth, accurate) switching between real-time kinematic mode and precise positioning mode, or associated method for quality check of rover offset vector.

FIG. 8 is a flow chart of identifying inaccuracies in the offset vectors that can be used to adjust priorities of use of the offset vector in the mobile receiver. The flow chart of the method of FIG. 8 may be used in conjunction with any of the other methods or procedures described in this document.

In shading situation at the mobile receiver 12 where the precise correction signal or the received satellite signals are lost or temporarily interrupted, the self-learned offset vector can be inaccurate. In these situations, the mobile receiver 12 can inaccurately declare the self-learned offset vector ready in the method of FIG. 6. To mitigate such situations, a consistency check is implemented across different offset vectors in the RTKX engine. The consistency check is based on the assumption that the base station 430 or reference receiver 30 is located in the relatively clean and open sky environment and, thus, would be more reliable than the mobile receiver 12 itself. The method of FIG. 8 beings in step S801.

In step S801, the quality evaluator 128, data processor 159 or navigation positioning estimator 57 determines the difference between the internally learned offset vector (e.g., rover bias or mobile offset vector) and the smoothed offset vector (e.g., smoothed base offset vector) from the base station 430.

In step S802, the quality evaluator 128, data processor 159 or navigation positioning estimator 57 determines whether difference in the horizontal components of the offset vectors (i.e., base offset vector and the mobile offset vector) is greater than a threshold. For example, the threshold may equal or be proportional to two sigma values (e.g., two standard deviations of a normal distribution or Gaussian-like distribution) of the filter co-variance estimate. Ideally, the difference between these two sources (i.e., base offset vector and the mobile offset vector) is small but in situation when rover's precise position solution is inaccurate, the self-learned offset vector will have large discrepancy (statistically) from the base station 430 or reference receiver 30.

In step S803, if the difference in the horizontal components (of the base offset vector and the mobile offset vector) is greater than the threshold (e.g., 2 sigma threshold), then RTKX module (409, 413) or the navigation positioning estimator designates the mobile offset vector of the mobile receiver (e.g., the self-learned bias) as inconsistent and uses the base offset vector (e.g., smoothed base offset vector) determined by the base station 430 or reference receiver 30 (if available) or relative position estimator 124 to prevent inaccurate rover precise position solution to be outputted in the solution at the RTKX module (409, 413).

Accordingly, the mobile offset vector from the mobile receiver will be available or regarded as a reliable offset vector if the difference is less than or equal to the threshold, the method can operate in accordance with the following priorities for use of offset vectors in step S804. The above integrity check performed in step S803 assures that reliable offset vectors are used in accordance with priority logic or rules, which may be expressed as if-then statements, hierarchical lists, Boolean logic, truth tables, conditional branches, trees, or otherwise.

In one embodiment, in step S804 the offset module 130, data processor, or navigation positioning estimator assigns priorities to the use of different offset vectors that may be available, such as those offset vectors that have not violated the above consistency or reliability test for the offset vector. In one embodiment, the following offset priority is used:

1. If the pulled-in (base) offset vector is available from a base station 430 or reference receiver 30, the first priority or the highest priority is given to the (base) offset vector from a base station 430 or reference receiver 30 that is simultaneously operating in a precise position mode and a real-time kinematic mode for a measurement time (e.g., epoch), or that determines a base offset vector (e.g., of an RTK data message) based on a difference between precise position and the known reference coordinates of the base station 430. The base station 430 has access to a precise correction signal (e.g., at a high precision level or higher precision level, where selection may be based on both reference receiver's and mobile receiver's operating under common precision levels, common receiver manufacturers, common or standard correction data message types, or most compatible correction data message types) for the measurement time (e.g., epoch). In one embodiment, the pulled-in precise position estimate is based on resolution of the integer ambiguities of the carrier phase for the received satellite signals for the measurement time or reaching a steady-state accuracy for the precise position estimate.

2. If the pulled-in (base) offset vector is not available from a base station 430 or receiver as described in above item 1, second priority is given to the (mobile) offset vector determined (e.g., learned) by the mobile receiver 12 by taking a difference between the RTK estimate (e.g., from the RTK position estimator 122 of the mobile receiver 12) and the corresponding precise position estimate (e.g., from the precise positioning estimator 120 of the mobile receiver 12) for the same measurement time (e.g., epoch) based on a precise correction signal. For example, the precise correction signal may be based on a RTG, Real-time GIPSY, PPP with precise clock and orbit corrections, or similar algorithms in the correction estimator at the data processing center which provides global precise clock and orbit corrections for the measurement time.

3. If the offset vector is not available under items 1 or 2 above, the third priority is given to the offset vector determined by a base station 430 or reference receiver 30 or precise positioning estimator that has attained a float-based precise position or float GNSS PPP solution (e.g., as a partial or substantial resolution of the ambiguities associated with the carrier phase measurements) based on a precise correction signal (e.g., higher precision level of precise correction signal with precise clock and orbit corrections), where the base station 430 and the reference receiver 30 are from the same manufacturer or use the same data format for RTK data messages or homogenous RTK data messages (e.g., to eliminate or ameliorate receiver bias).

4. If the offset vector is not available under items 1, 2 or 3 above, the fourth priority is given to the offset vector determined by a base station 430 or reference receiver 30 or precise positioning estimator that has attained a float-based precise position or float GNSS PPP solution (e.g., as a partial or substantial resolution of the ambiguities associated with the carrier phase measurements) based on a precise correction signal (e.g., high precision precise correction signal lower than the highest precision precise clock and orbit corrections), where the base station 430 and the reference receiver 30: (a) are from the same manufacturer or use the same data format for RTK data messages or homogenous RTK data messages, or (b) are from different manufacturers and use a standard format for RTK data messages.

5. If the offset vector is not available under above items 1 through 4, inclusive, the fifth priority is given to an offset vector retrieved or access from the data storage device 155, such as non-volatile random access memory (NVRAM). Stored vector bias has the least priority and live signal is always preferred, even if the stored vector bias is based on the precise position estimate derived from a precise correction signal (e.g., highest precision precise correction signal with precise clock and orbit corrections) for the measurement time.

In certain embodiments, the precise correction signal, differential correction data or correction data can refer to one or more of the following: (a) high precision level of correction data where the correction data is provided by RTG, Real-time GIPSY, or similar algorithms in the correction estimator at the data processing center which provides global precise clock and orbit corrections for the measurement time, or (b) higher precision level of the correction data or precise correction data with precise clock and orbit corrections provided by the data processing center, or the correction estimator (e.g., to support the operation of mobile receivers 12 in the precise positioning mode (PPP mode)), where the higher precision level is greater than a high precision level.

Figure 9A:
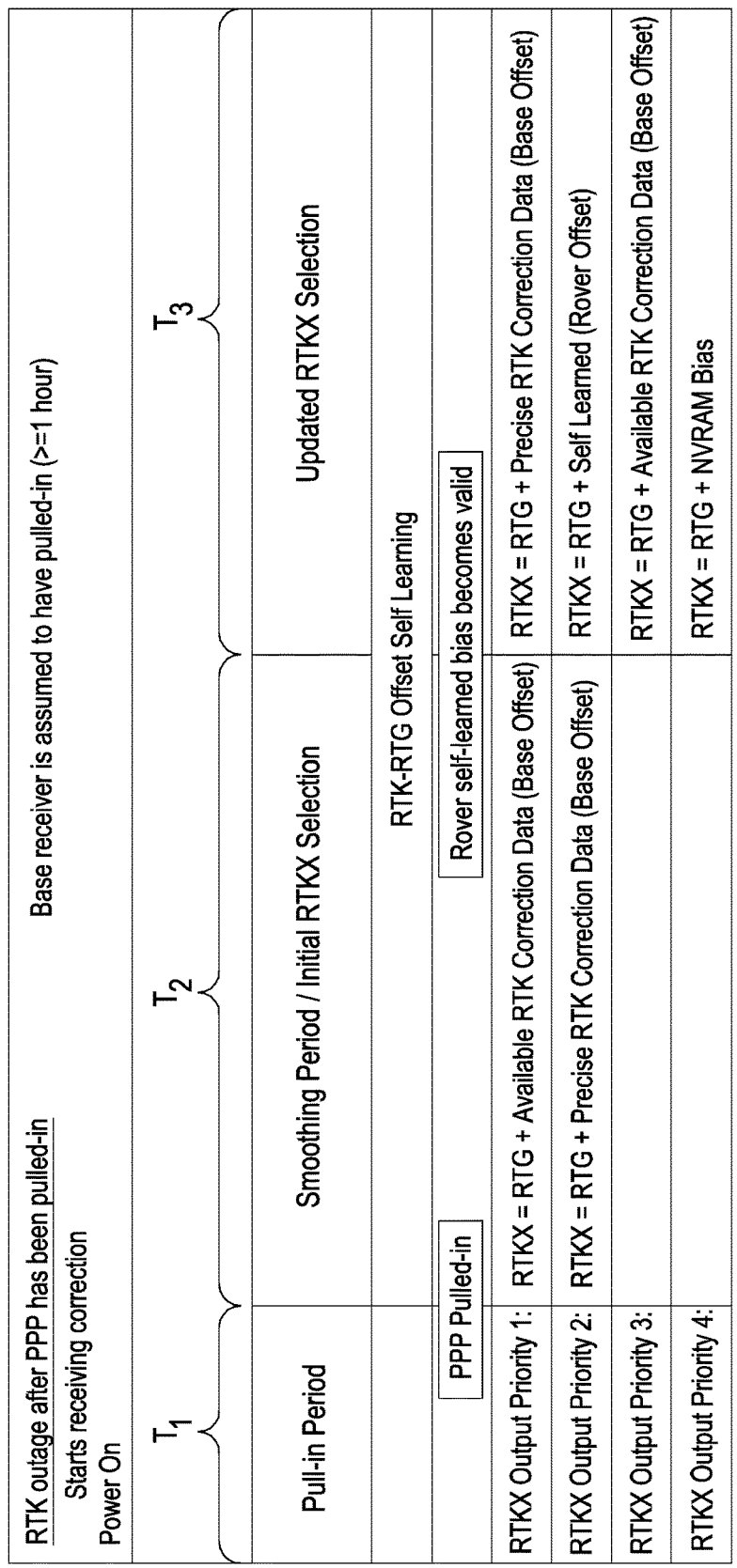
FIG. 9A is a flow chart of a time-line associated with an RTK signal outage of the RTK correction data after the mobile receiver has pulled-in or converged on integer ambiguities to provide precise position estimates.

FIG. 9A is a flow chart of a time-line associated with an RTK signal outage of the RTK correction data after the mobile receiver 12 has pulled-in or converged on integer ambiguities to provide precise position estimates. In FIG. 9A, the horizontal axis represents time, which is divided into a first time period or pull-in period (e.g., $T_1$), a second time period or smoothing period/initial RTKX period (e.g., $T_2$), and a third time period or updated RTKX period (e.g., $T_3$). The first time period extends from an initialization time or turning on of the receiver (such as a reference receiver 30 or base station 430) until the received signals are pulled-in for an ambiguity resolved position solution. Although the first time period may have other durations, in one illustrative example the first time period for a navigation receiver tends to have a duration between approximately 1,200 epochs and approximately 3,600 epochs. The second time period extends from the time when the received signals are first pulled-in to the to the time when the rover receiver 12 converges or the rover self-learning filter 444 converges on a position solution. Although the second time period may have other durations, in one illustrative example the second time period for a navigation receiver (12, 30) tends to have a duration of at least 300 measurement epochs or until covariance is less than a threshold. For example, the rover receiver 12 converges when the smoothing filter 442 converges or when the self-learned bias of the self-learning filter 444 or rover filter becomes valid.

FIG. 9A illustrates the priority levels that are given to different available position estimates in the RTK extend mode, or RTK extend modes (e.g., operation in precise positioning mode with an offset vector). The available RTK extend modes can depend upon parameters such as: (1) whether the base station 430 or reference receiver 30 has pulled-in or converged on a position solution after resolution of ambiguities in the receiver carrier phase, (2) whether the mobile receiver 12 or rover has pulled-in or converged on a position solution after resolution of ambiguities in the receiver carrier phase, (3) RTK correction data, RTK correction data format, or resolution level of RTK correction data, where resolution level may refer to: (a) high resolution level based on high-accuracy precise clock and orbit corrections in conjunction with precise positioning estimation (e.g., PPP estimation) of position solutions or (b) higher resolution (than the high resolution) based on higher-accuracy precise clock and orbit corrections, and (4) receiver manufacturer or precise positioning algorithms used by particular receiver manufacturer.

The reference receiver 30 is associated with a wireless communications device 428 for wirelessly transmitting the RTK correction data to the mobile receiver 12 via its correction wireless device (14, 114, 214) (e.g., communications device). In the second time period, as illustrated, the first priority is given to a first RTKX mode in which the position estimate is based on a precise position estimate (e.g., RTG or PPP estimate) added to a base offset vector, such as a base offset vector that is compatible with multiple types of RTK correction data formats, associated with one or more reference receivers 30 that have first converged on solutions, or associated with one or more reference receivers 30 that are closest to or within maximum baseline distance to the mobile receiver 12. For the first priority, the base offset vector may comprise an available RTK correction data, such as the first RTK data format (e.g., higher resolution) or the second RTK data format (e.g., high resolution).

In the second time period, as illustrated, the second priority is given a second RTKX mode in which the position estimate is based on a precise position estimate (e.g., RTG or PPP estimate) added to a base offset vector based on RTK correction data from a precise position solution (e.g., highest resolution level of RTK correction data). For the second priority, the base offset vector may comprise precise RTK correction data, such as the first RTK data format.

In the third time period, the first priority is given to a first RTKX mode in which the position estimate is based on a precise position estimate (e.g., RTG or PPP estimate) added to a base offset vector based on RTK correction data from a precise position solution (e.g., highest resolution level of RTK correction data). In the third time period, the second priority is given to a second RTKX mode in which the position estimate is based on a precise position estimate (e.g., RTG or PPP estimate) added to a mobile offset vector, a rover offset vector, or rover self-learned bias determined (e.g., learned) by the mobile receiver 12 by taking a difference between the RTK estimate (e.g., from the RTK position estimator 122 of the mobile receiver 12) and the corresponding precise position estimate (e.g., from the precise positioning estimator 120 of the mobile receiver 12) for the same measurement time (e.g., epoch) based on a precise correction signal. In the third time period, the third priority is given to a third RTKX mode in which the position estimate is based on a precise position estimate (e.g., RTG or PPP estimate) added to a base offset vector, such as a base offset vector that is compatible with multiple types of RTK correction data formats (e.g., first RTK data format and a second RTK data format) or that is operating in a float mode of ambiguity resolution. In the third time period, the fourth priority is given to a fourth RTKX mode in which the position estimate is based on a precise position estimate (e.g., RTB or PPP estimate) added to a stored base offset vector that is stored in a data storage device 155 associated with the mobile receiver 12 and that is sufficiently current (e.g., not stale) or based on recent observed carrier phase measurements.

Figure 9B:
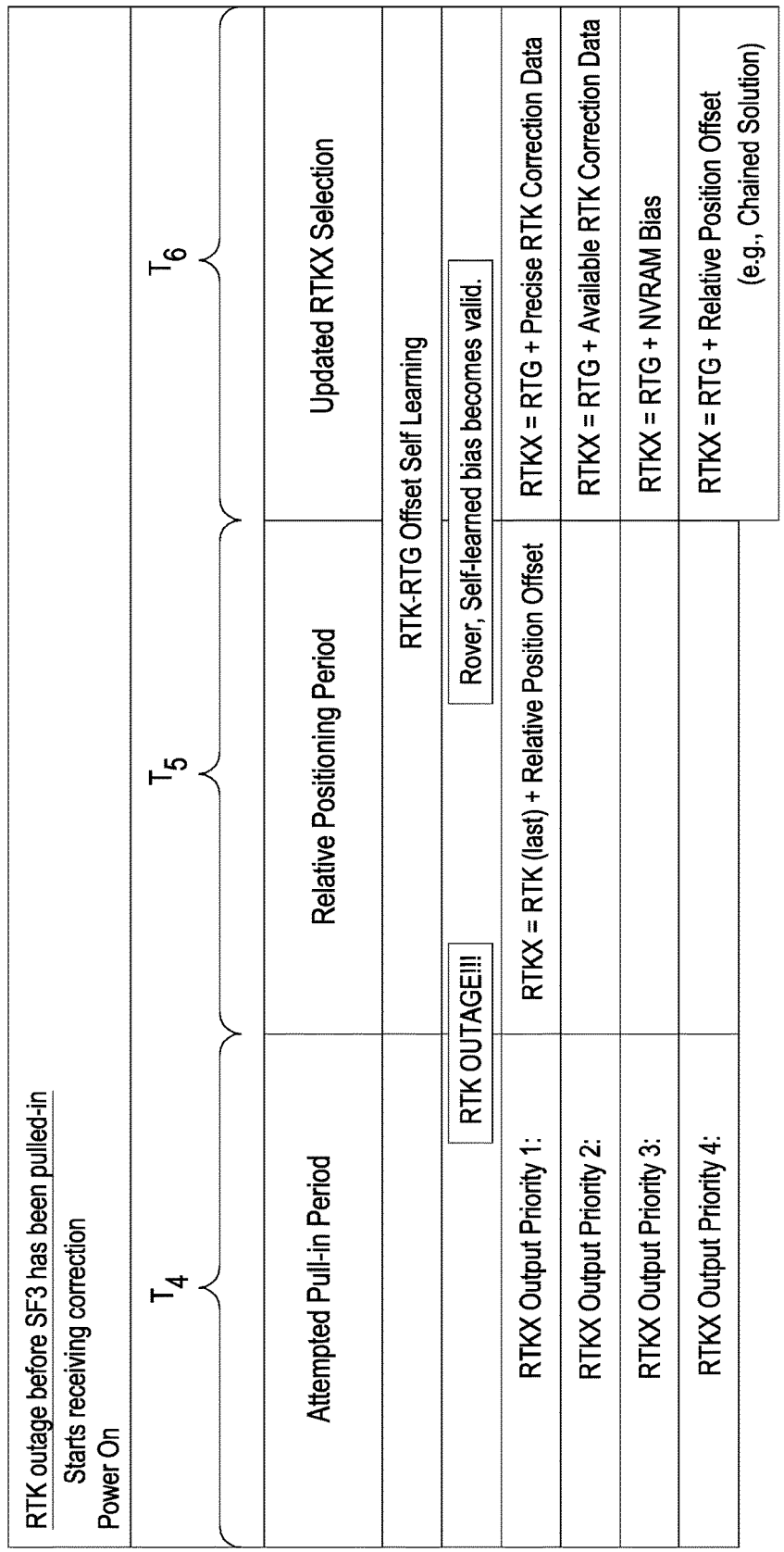
FIG. 9B is a flow chart of a time-line associated with an RTK signal outage of the RTK correction data before the mobile receiver has pulled-in or converged on integer ambiguities to provide precise position estimates.

FIG. 9B is a flow chart of a time-line associated with an RTK signal outage of the RTK correction data before the mobile receiver 12 has pulled-in or converged on integer ambiguities to provide precise position estimates. In FIG. 9B, the horizontal axis represents time, which is divided into a fourth time period (e.g., $T_4$) or attempted pull-in period, a fifth time period (e.g., $T_5$) or a relative positioning period, and a sixth time period (e.g., $T_6$) or updated RTKX period. The fourth time period extends from an initialization time or turning on of the receiver (such as a reference receiver 30 or base station 430) until the received signals are attempted to be pulled- in, but not actually pulled-in, for an ambiguity resolved position solution. Although the fourth time period may have other durations, in one illustrative example the fourth time period for a navigation receiver 12 tends to have a duration between approximately 1,200 epochs and approximately 3,600 epochs.

The fifth time period extends from the time when RTK correction signal is lost, interrupted or corrupted until the time when the rover receiver 12 converges or the rover self-learning filter 444 converges on a position solution. Although the fifth time period may have other durations, in one illustrative example the fifth time period for a navigation receiver (e.g., 12) tends to have approximately 300 epochs or until covariance is less than a threshold, subject to a maximum limit (e.g., of approximately one hour). Once the maximum limit has been reached for the fifth time period or the relative positioning period, the accuracy of the relative position may degrade, unless special measures are taken, such as chained solutions achieved by chaining multiple relative solutions together to preserve continuity. In the fifth time period, the first priority or the only priority is given to a first RTKX mode in which the position estimate is based on a last available RTK estimate (e.g., at the mobile receiver 12 prior to loss, interruption or corruption of the RTK correction signal at the mobile receiver 12) added to the differential position between the measured position of the RTK reference receiver 30 and the known position (e.g., actual coordinates of the RTK reference receiver 30).

In the sixth time period, the first priority is given to a first RTKX mode in which the position estimate is based on a precise position estimate (e.g., RTG or PPP estimate) added to a base offset vector based on RTK correction data from a precise position solution (e.g., highest resolution level of RTK correction data or associated with first RTK data format). In the sixth time period, the second priority is given to a second RTKX mode in which the position estimate is based on a precise position estimate (e.g., RTG or PPP estimate) added to a base offset vector, such as a base offset vector that is compatible with multiple types of RTK correction data formats (e.g., first RTK data format and second RTK data format) or that is operating in a float mode of ambiguity resolution. In the sixth time period, the third priority is given to a fourth RTKX mode in which the position estimate is based on a precise position estimate (e.g., RTG or PPP estimate) added to a stored base offset vector that is stored in a data storage device 155 associated with the mobile receiver 12 and that is sufficiently current (e.g., not stale) or based on recent observed carrier phase measurements. In the sixth time period, the fourth priority is given to a fourth RTKX mode in which the position estimate is based on a precise position estimate (e.g., RTG or PPP estimate) added to mobile offset estimated by the rover self-learning filter.

Having described the preferred embodiment, it will become apparent that various modifications can be made without departing from the scope of the invention as defined in the accompanying claims.

The following is claimed:

1. A method for operating one or more satellite navigation receivers, the method comprising:
 receiving, by a reference receiver, one or more satellite signals;
 measuring, by the reference receiver, a carrier phase of the received satellite signals;
 receiving, at the reference receiver, a precise signal encoded with precise correction data;
 determining, by a precise positioning estimator of the reference receiver, a precise position based on the measured carrier phase of the received satellite signals and the received precise correction data in a precise correction mode;
 determining a base offset vector between the precise position and a reference real-time kinematic (RTK) position for the reference receiver;

transmitting, via an RTK signal, RTK correction data, which comprises a representation of the base offset vector, to a mobile receiver;

receiving, by the mobile receiver, one or more satellite signals;

measuring, by the mobile receiver, a carrier phase of the received satellite signals;

receiving, at the mobile receiver, the RTK correction data comprising the base offset vector;

smoothing the base offset vector to yield a reliable smoothed base offset vector after an initialization time period;

determining, by a real-time kinematic (RTK) position estimator of the mobile receiver, a real-time kinematic position based on the measured carrier phase of the received satellite signals and the received RTK correction data in an RTK correction mode:

receiving, at the mobile receiver, a precise signal encoded with precise correction data;

determining, by a precise positioning estimator of the mobile receiver, a precise position based on the measured carrier phase of the received satellite signals and the received precise correction data in a precise correction mode; and upon loss or interruption of the RTK signal, while reaching an end of the initialization time period with the smoothed base offset vector and while having attained convergence on the precise position in conjunction with ambiguity resolution of the measured carrier phase associated with the precise position at the mobile receiver, switching to a precise position mode, wherein a next precise position estimate is compensated by the smoothed base offset vector to avoid a jump or discontinuity in the next precise position estimate.

2. The method according to claim 1 further comprising:
determining a relative position of the mobile receiver;
upon loss, interruption or corruption of the RTK signal, while not having a smoothed base offset vector that is smoothed over a threshold duration or over the initialization time period, or not reaching an end of the initialization time period of the smoothing filter, and while not converging on the precise position at the mobile receiver, switching to a relative position mode.

3. The method according to claim 2 wherein a next precise position estimate is based on a last available RTK position prior to the loss and a relative position vector between a last available measurement time and a next measurement time.

4. The method according to claim 1 further comprising:
upon loss, interruption or corruption of the RTK signal, while not reaching the end of an initialization time period without the base offset vector determined over a threshold duration or while converging on phase ambiguities underlying the precise position for the base offset vector, switching to the precise position mode, wherein a next precise position estimate is compensated by a stored offset vector in a data storage device of the mobile receiver from a prior convergence of the precise position at the reference receiver or the mobile receiver to avoid a jump or discontinuity in the next precise position estimate.

5. The method according to claim 1 further comprising:
upon loss or interruption of the RTK signal, while reaching of the end of an initialization time period with a smoothed base offset vector and while having attained convergence on the precise position in conjunction with ambiguity resolution of the measured carrier phase associated with the precise position, switching to a precise position mode, wherein a next precise position estimate is compensated by the smoothed base offset vector and wherein the smoothed base offset vector applies to the reference receiver and the mobile receiver of the same manufacturer that does not require an additional receiver bias to avoid a jump or discontinuity in the next precise position estimate.

6. A method for operating one or more satellite navigation receivers, the method comprising:
receiving, by a reference receiver, one or more satellite signals;

measuring, by the reference receiver, a carrier phase of the received satellite signals;

receiving, at the reference receiver, a precise signal encoded with precise correction data;

determining, by a precise positioning estimator of the reference receiver, a precise position based on the measured carrier phase of the received satellite signals and the received precise correction data in a precise correction mode;

determining a base offset vector between the precise position and a reference real-time kinematic (RTK) position for the reference receiver;

transmitting, via an RTK signal, RTK correction data, which comprises a representation of the base offset vector, to a mobile receiver; and upon loss, interruption, or corruption of the RTK signal, while not reaching the end of an initialization time period or while reaching the end of the initialization time period without the base offset vector determined over a threshold duration and while not converging on resolved phase ambiguities underlying the precise position for the base offset vector, switching to the precise position mode, wherein a next precise position estimate is compensated by a rover offset vector to avoid a jump or discontinuity in the next precise position estimate.

7. The method according to claim 6 further comprising:
receiving, by the mobile receiver, one or more satellite signals;

measuring, by the mobile receiver, a carrier phase of the received satellite signals;

receiving, at the mobile receiver, the RTK correction data comprising the base offset vector;

at the mobile receiver, determining, by a real-time kinematic (RTK) position estimator of the mobile receiver, a real-time kinematic position based on the measured carrier phase of the received satellite signals and the received RTK correction data in an RTK correction mode;

receiving, at the mobile receiver, a precise signal encoded with precise correction data;

determining, by a precise positioning estimator of the mobile receiver, a precise position based on the measured carrier phase of the received satellite signals and the received precise correction data in a precise correction mode;

determining a rover offset vector between the precise position and the RTK position for the same measurement time or epoch.

8. The method according to claim 6 further comprising:
determining a relative position of the mobile receiver;
upon loss, interruption or corruption of the RTK signal, while not having a smoothed base offset vector that is smoothed over a threshold duration or over the initialization time period, or not reaching an end of the initialization time period of the smoothing filter, and while not converging on the precise position at the mobile receiver, switching to a relative position mode.

9. The method according to claim 8 wherein a next precise position estimate is based on a last available RTK position prior to the loss and a relative position vector between a last available measurement time and a next measurement time.

10. A system for operating one or more satellite navigation receivers, comprising:
at a reference receiver, a measurement module for measuring a carrier phase of the received satellite signals;
a correction wireless device for receiving, at the reference receiver, a precise signal encoded with precise correction data;
a precise positioning estimator of the reference receiver for determining a precise position based on the measured carrier phase of the received satellite signals and the received precise correction data in a precise correction mode;
at the reference receiver, an offset module for determining a base offset vector between the precise position and a reference RTK position for the reference receiver;
at the reference receiver, a wireless communications device for transmitting, via an RTK signal, RTK correction data, which comprises a representation of the base offset vector, to a mobile receiver;
at the mobile receiver, an offset module for determining a mobile offset vector between the precise position and the RTK position for the same measurement time or epoch;
upon loss, interruption or corruption, of the RTK signal, while attaining the smoothed base offset vector and while not having converged on resolved phase ambiguities underlying the precise position for the base offset vector, a mode controller adapted to switch to the precise position mode, wherein a next precise position estimate is compensated by the mobile offset vector to avoid a lump or discontinuity in the next precise position estimate.

11. The system according to claim 10 further comprising:
at the mobile receiver, a measurement module for measuring a carrier phase of the received satellite signals;
a wireless communications device for receiving, at the mobile receiver, the RTK correction data comprising the base offset vector;
at the mobile receiver, a smoothing filter for smoothing the received base offset vector to yield a smoothed base offset vector after an initialization period; and
a real-time kinematic (RTK) position estimator of the mobile receiver for determining a real-time kinematic position based on the measured carrier phase of the received satellite signals and the received RTK correction data in an RTK correction mode.

12. The system according to claim 11 further comprising:
the mode controller authorizing the compensation by the smoothed base offset vector if the smoothing filter has reached an end of the initialization time period to yield the smoothed base offset vector, and if the precise position estimator of the mobile receiver has converged upon the precise position in conjunction with ambiguity resolution of the measured carrier phase associated with the precise position.

13. The system according to claim 10 further comprising:
upon loss, interruption or corruption of the RTK signal, while not reaching the end of the initialization time period and while not converging on the precise position for the base offset vector, a mode controller adapted to switch to the precise position mode, wherein a next precise position estimate is compensated by the stored offset vector in a data storage device of the mobile receiver associated with a prior convergence of the precise position at the reference receiver or the mobile receiver to avoid a jump or discontinuity in the next precise position estimate.

14. The system according to claim 10 further comprising:
at the mobile receiver, a measurement module for measuring a carrier phase of the received satellite signals;
a wireless communications device for receiving, at the mobile receiver, the RTK data correction data;
a real-time kinematic (RTK) position estimator of the mobile receiver for determining a real-time kinematic position based on the measured carrier phase of the received satellite signals and the received RTK correction data in an RTK correction mode;
a correction wireless device for receiving, at the mobile receiver, a precise signal encoded with precise correction data;
a precise positioning estimator of the mobile receiver for determining a precise position based on the measured carrier phase of the received satellite signals and the received precise correction data in a precise correction mode;
at the mobile receiver, an offset module for determining a mobile offset vector between the precise position and the RTK position for the same measurement time or epoch; and
upon loss, interruption or corruption of the RTK signal, a mode controller adapted to switch to a precise position mode, wherein a next precise position estimate is compensated by the mobile offset vector to avoid a jump or discontinuity in the next precise position estimate.

15. The system according to claim 10 further comprising:
a relative positioning estimator for determining a relative position of the mobile receiver;
upon loss of the RTK signal and while not converging on the precise position, a mode controller adapted to switch to a relative position mode.

16. The system according to claim 15 wherein a next precise position estimate is based on a last available RTK position prior to the loss and the determined relative position from the time of the loss to the next time.

17. The system according to claim 10 further comprising:
upon loss or interruption of the RTK signal while reaching of the end of the initialization time period without a smoothed base offset vector and while attaining convergence on the precise position in conjunction with ambiguity resolution of the measured carrier phase associated with the precise position, a navigation positioning estimator is adapted to switch to a precise position mode, wherein a next precise position estimate is compensated by the smoothed base offset vector and wherein the smoothed base offset vector applies to the reference receiver and the mobile receiver of the same manufacturer that does not require an additional receiver bias to avoid a jump or discontinuity in the next precise position estimate.

* * * * *